United States Patent
Otani

(10) Patent No.: US 9,819,917 B2
(45) Date of Patent: Nov. 14, 2017

(54) PROJECTOR

(71) Applicant: SEIKO EPSON CORPORATION, Tokyo (JP)

(72) Inventor: Makoto Otani, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 344 days.

(21) Appl. No.: 14/539,430

(22) Filed: Nov. 12, 2014

(65) Prior Publication Data

US 2015/0172609 A1 Jun. 18, 2015

(30) Foreign Application Priority Data

Nov. 13, 2013 (JP) .................. 2013-234712
Aug. 4, 2014 (JP) .................. 2014-158447

(51) Int. Cl.
| | | |
|---|---|---|
| *H04N 9/31* | (2006.01) | |
| *G03B 21/20* | (2006.01) | |
| G02B 5/02 | (2006.01) | |
| G02B 3/00 | (2006.01) | |
| G02B 5/30 | (2006.01) | |
| G03B 21/00 | (2006.01) | |

(52) U.S. Cl.
CPC ......... *H04N 9/3152* (2013.01); *G03B 21/208* (2013.01); *H04N 9/3126* (2013.01); *G02B 3/0056* (2013.01); *G02B 5/0278* (2013.01); *G02B 5/3083* (2013.01); *G03B 21/005* (2013.01)

(58) Field of Classification Search
CPC .. H04N 9/3105; H04N 9/3126; H04N 9/3138; H04N 9/3102; H04N 9/3132; H04N 9/315; H04N 9/3161; H04N 9/3164; H04N 9/3197; G02B 5/3083; G03B 21/14; G03B 21/2013; G03B 21/2033; G03B 21/2066; G03B 21/28
See application file for complete search history.

(56) References Cited

U.S. PATENT DOCUMENTS

| | | | |
|---|---|---|---|
| 5,930,056 A * | 7/1999 | Ohashi | G02B 9/08 359/663 |
| 7,234,822 B2 | 6/2007 | Uchiyama et al. | |
| 7,317,578 B2 | 1/2008 | Drazic et al. | |
| 7,551,341 B1 * | 6/2009 | Ward | G03B 33/08 359/248 |
| 7,712,902 B2 | 5/2010 | Nakamura et al. | |

(Continued)

FOREIGN PATENT DOCUMENTS

| | | | | |
|---|---|---|---|---|
| CA | WO 2014085895 A1 * | 6/2014 | | G02B 27/48 |
| CN | 102213899 A | 10/2011 | | |

(Continued)

*Primary Examiner* — Christina Riddle
*Assistant Examiner* — Christopher Lamb, II
(74) *Attorney, Agent, or Firm* — Oliff PLC

(57) ABSTRACT

A relay optical system exhibits an action of deflecting light with respect to passing luminous flux as a result of being provided with a light deflection member, and thus a cross-section of the luminous flux can be adjusted to a state of having an appropriate size (enlarged size), that is, a state in which an image is not completely formed but is blurred, at image formation positions of color modulation light valves. Therefore, it is possible to form a favorable image by minimizing moire.

18 Claims, 20 Drawing Sheets

(56) References Cited

U.S. PATENT DOCUMENTS

| | | | |
|---|---|---|---|
| 2004/0228005 A1* | 11/2004 | Dowski, Jr. | G02B 5/3083 359/671 |
| 2005/0271312 A1 | 12/2005 | Uchiyama et al. | |
| 2006/0082892 A1 | 4/2006 | Drazic et al. | |
| 2006/0215130 A1 | 9/2006 | Nakamura et al. | |
| 2007/0134438 A1* | 6/2007 | Fabick | B32B 27/08 428/1.1 |
| 2007/0273849 A1* | 11/2007 | Takeda | G02B 5/0242 353/122 |
| 2009/0021830 A1* | 1/2009 | Totzeck | G02B 5/3083 359/489.03 |
| 2009/0262261 A1* | 10/2009 | Ishino | G03B 33/12 348/744 |
| 2010/0027295 A1* | 2/2010 | Lee | G02B 3/0043 362/622 |
| 2011/0242490 A1 | 10/2011 | Itoh | |
| 2011/0292505 A1* | 12/2011 | Kurtz | G02B 7/028 359/489.14 |
| 2014/0133018 A1* | 5/2014 | Matsubara | G03B 21/625 359/448 |
| 2015/0309326 A1* | 10/2015 | Nicholson | G02B 27/48 359/15 |

FOREIGN PATENT DOCUMENTS

| | | |
|---|---|---|
| JP | A-2005-189282 | 7/2005 |
| JP | A-2005-208573 | 8/2005 |
| JP | A-2006-509244 | 3/2006 |
| JP | A-2006-243477 | 9/2006 |
| JP | A-2007-148319 | 6/2007 |
| JP | A-2007-218946 | 8/2007 |

* cited by examiner

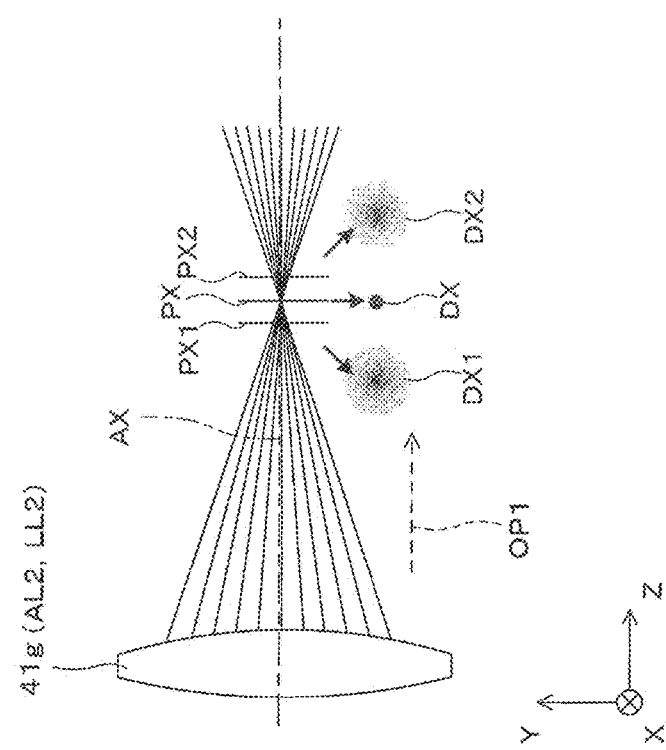
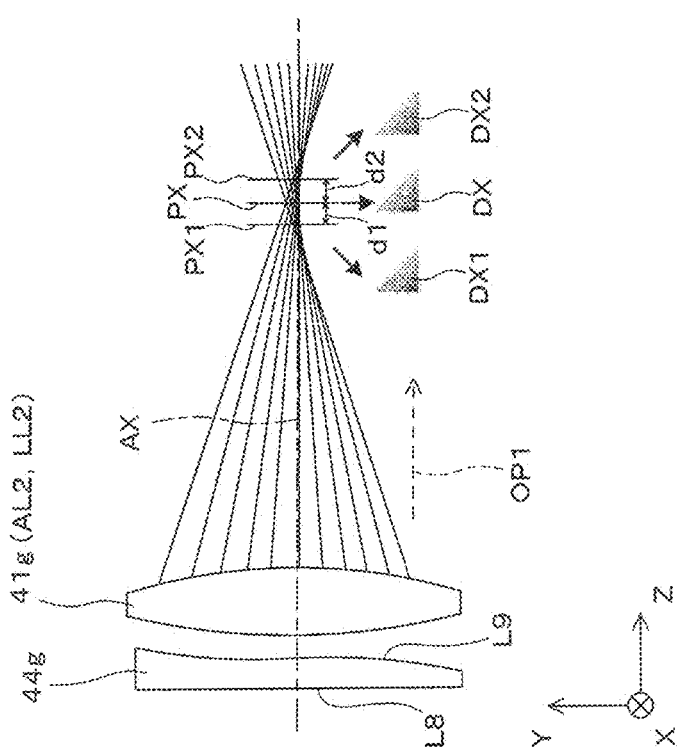
FIG. 4A
FIG. 4B

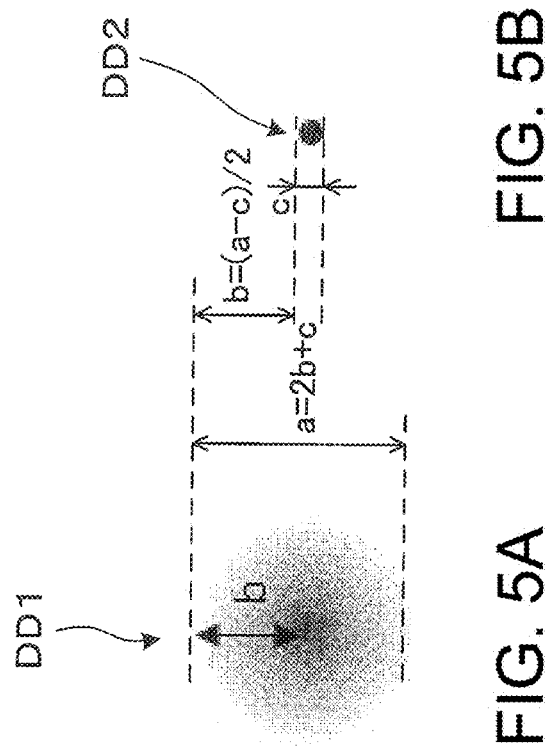

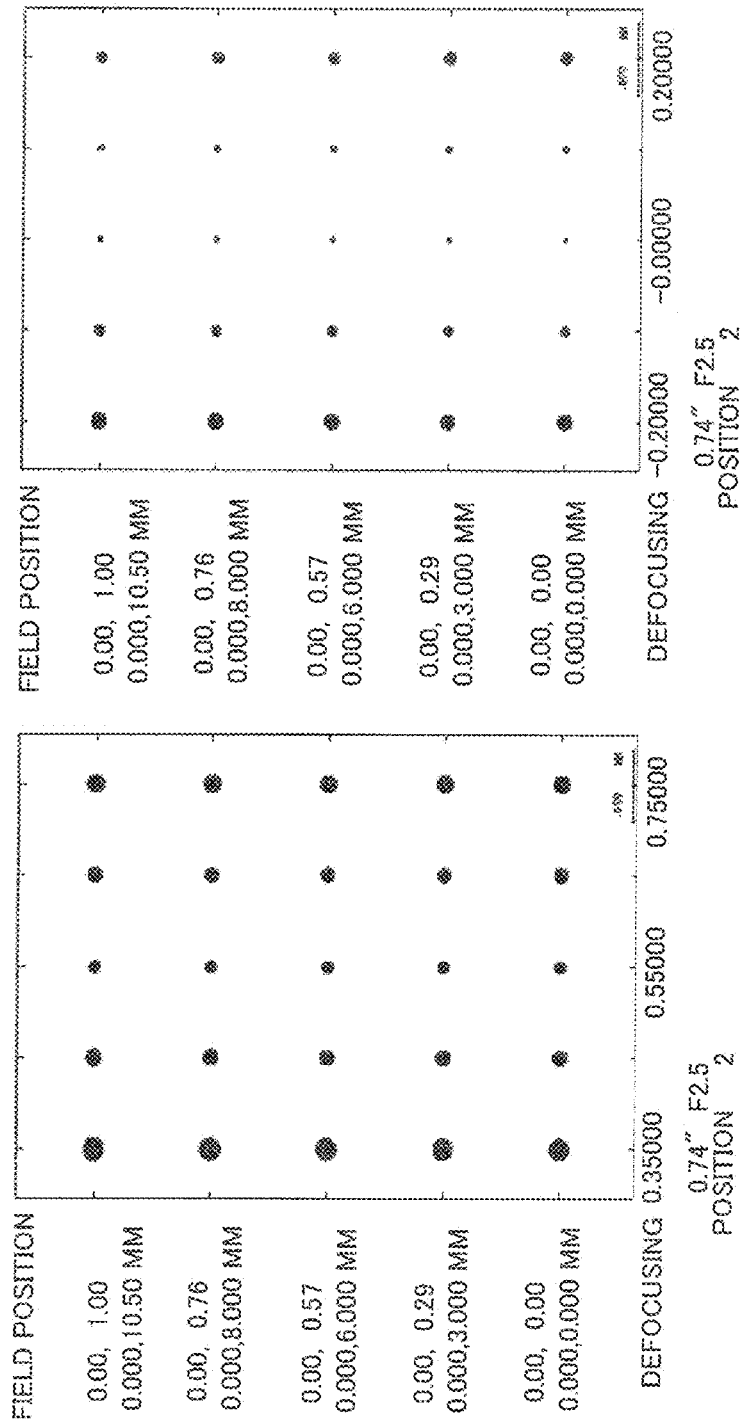

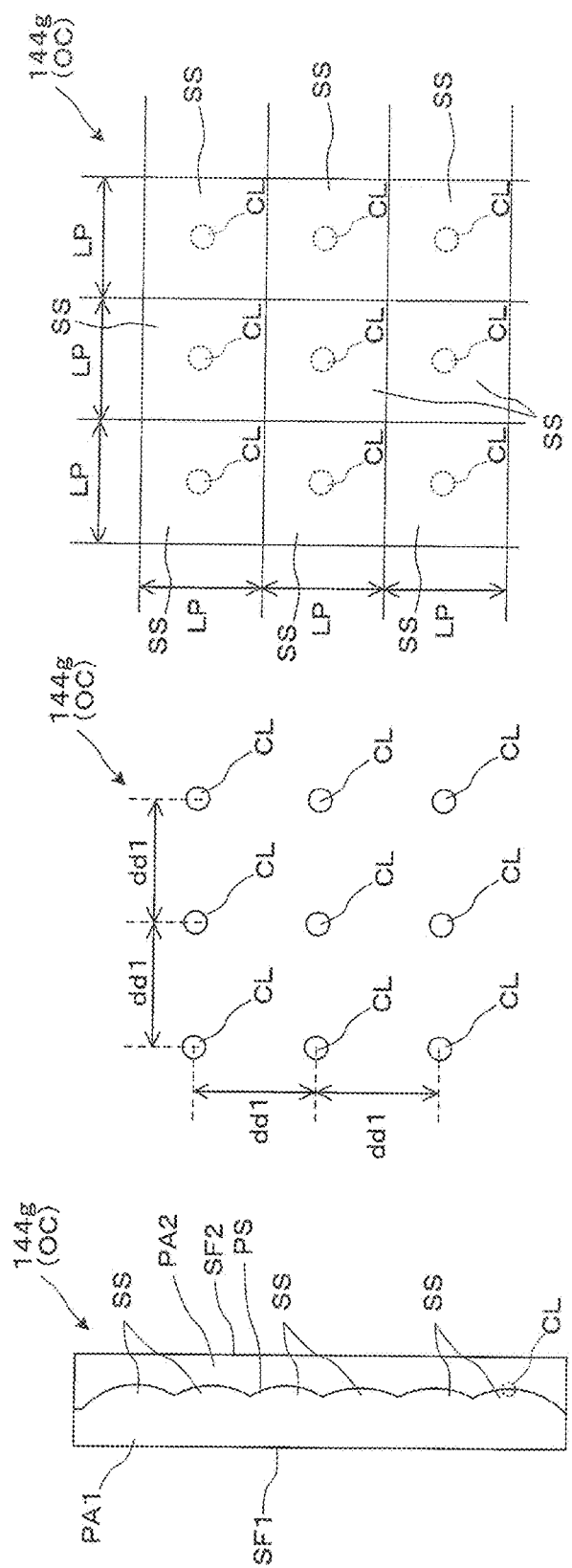

FIG. 13A
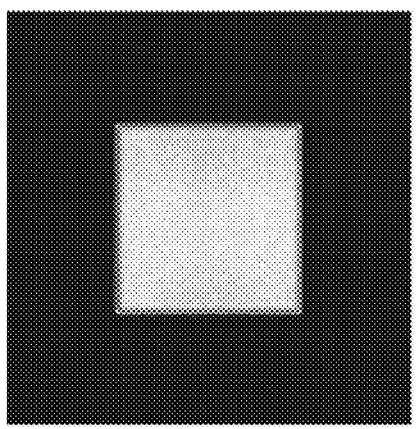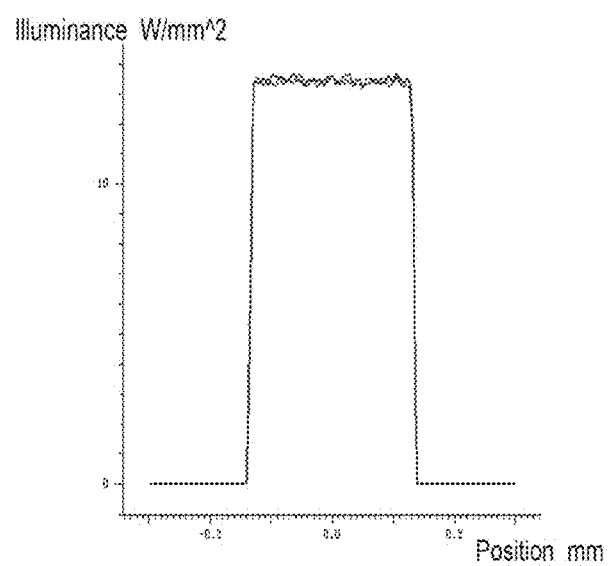
FIG. 13B
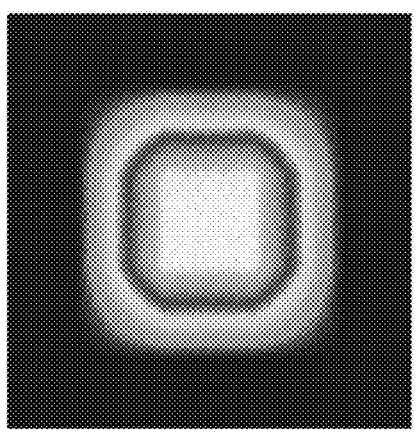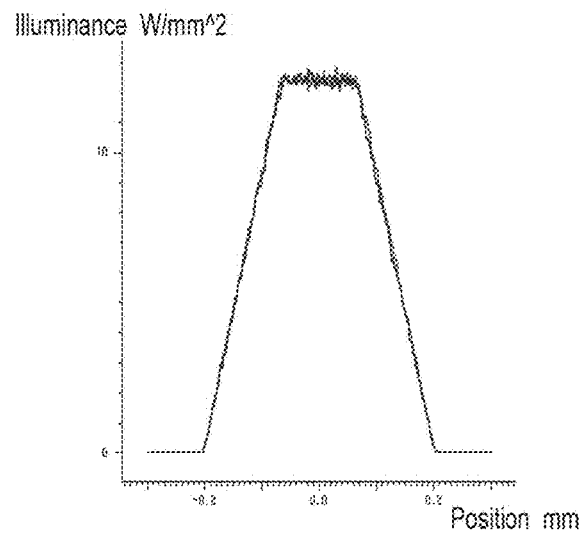

FIG. 13C
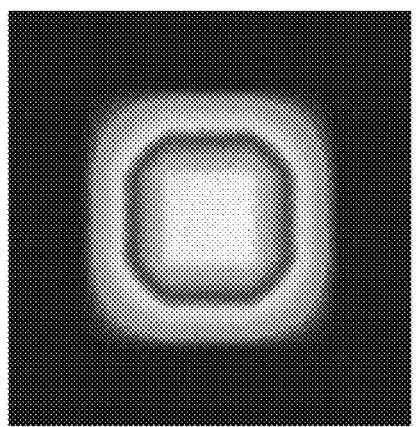 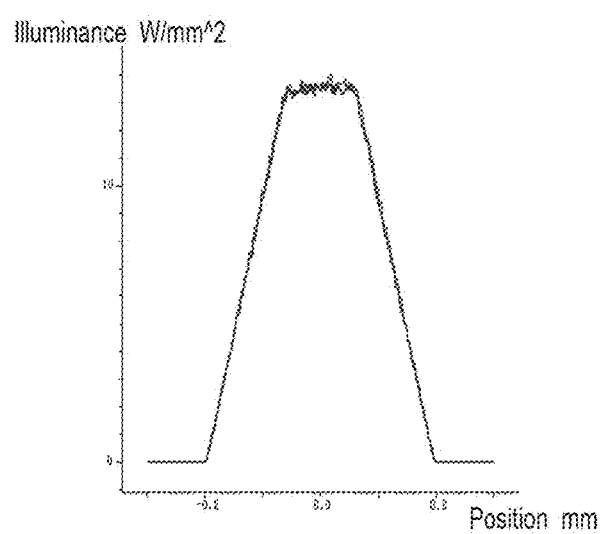
FIG. 13D
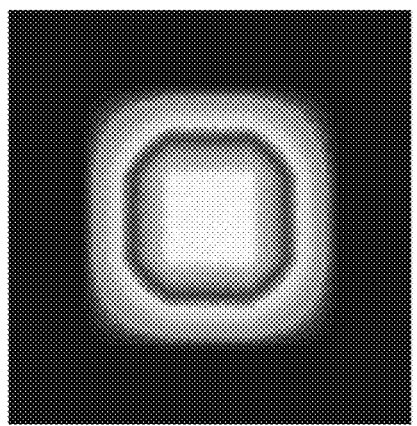 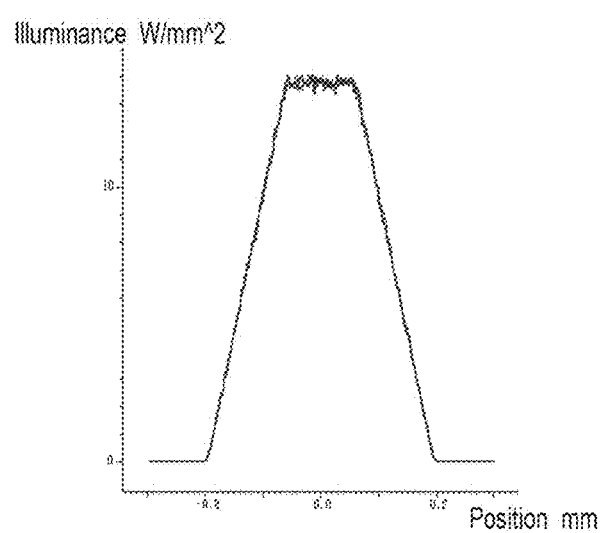

FIG. 13E
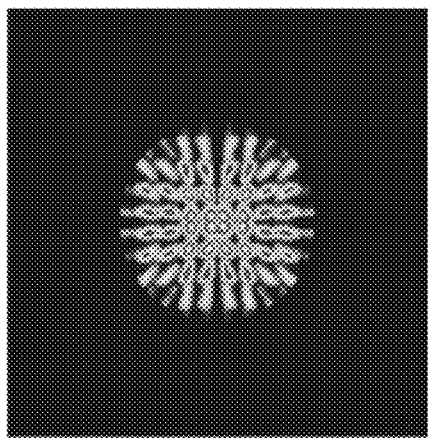 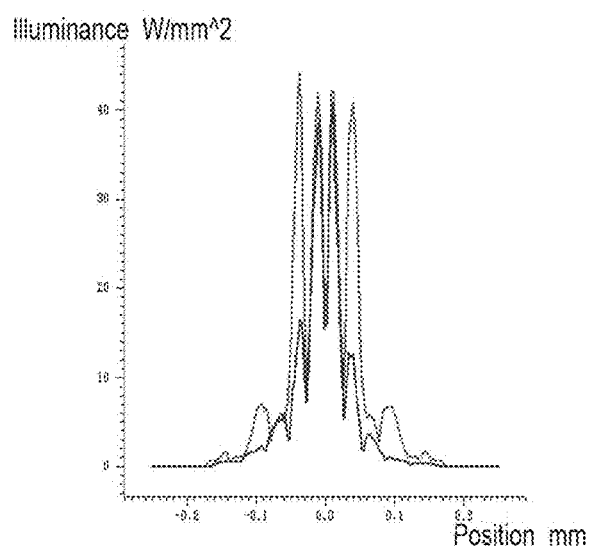
FIG. 13F
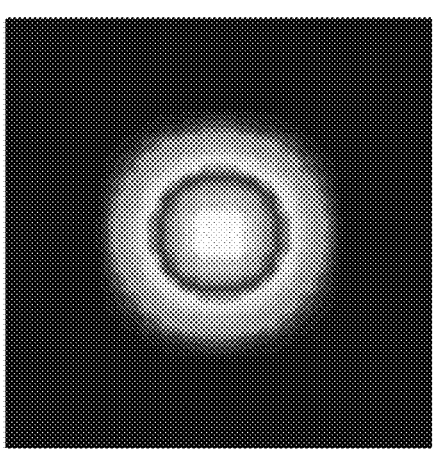 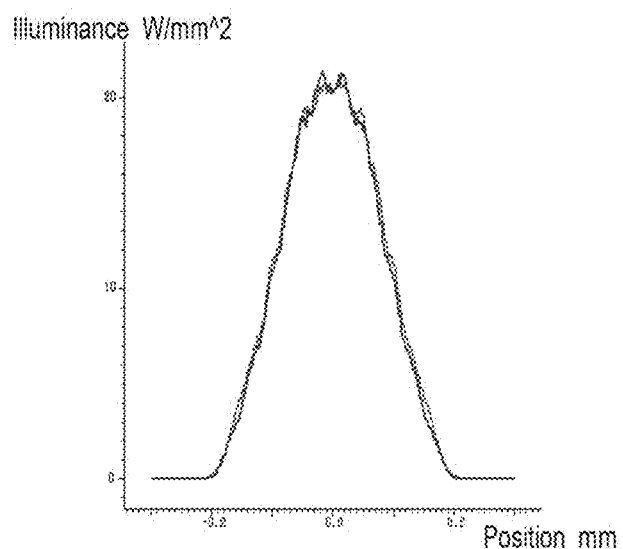

FIG. 13G
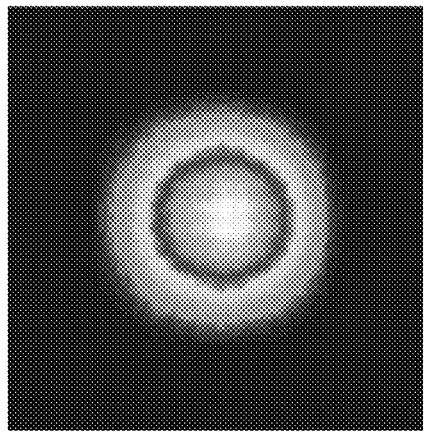 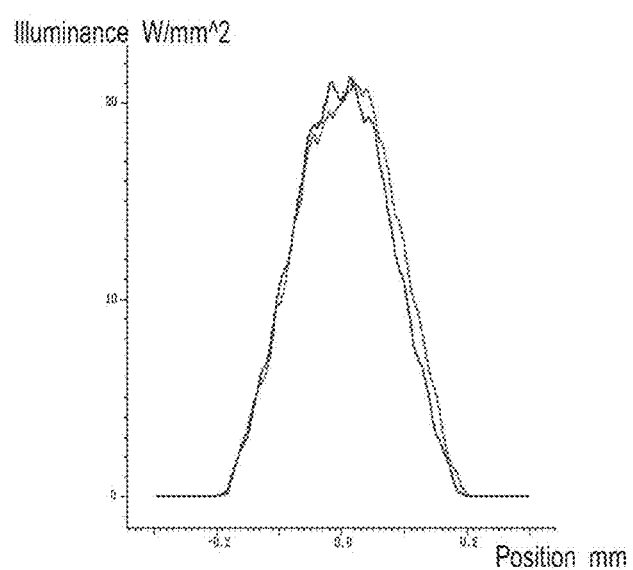
FIG. 13H
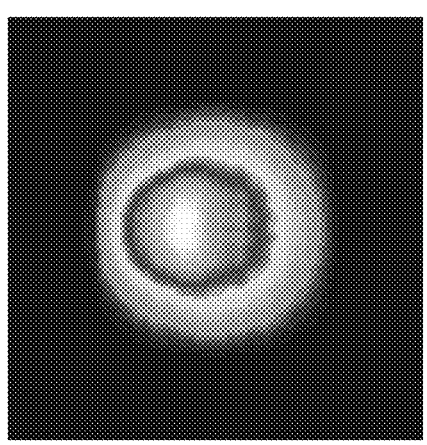 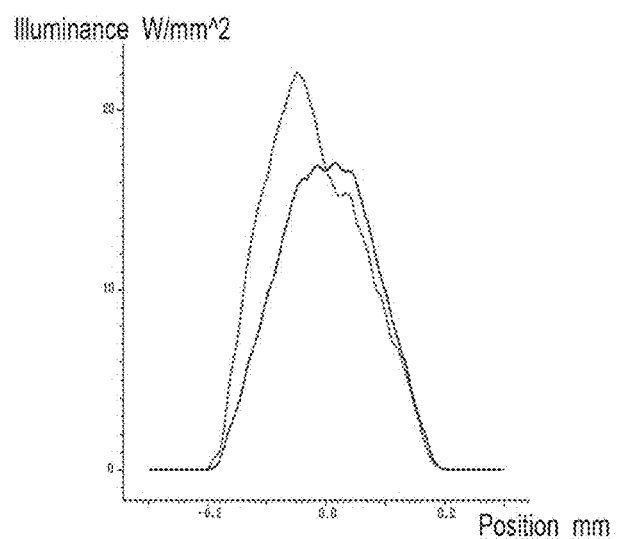

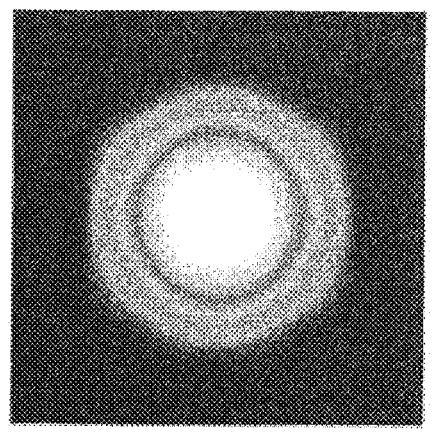
FIG. 15D
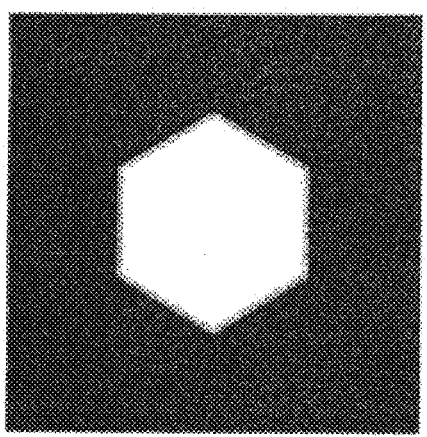
FIG. 15C
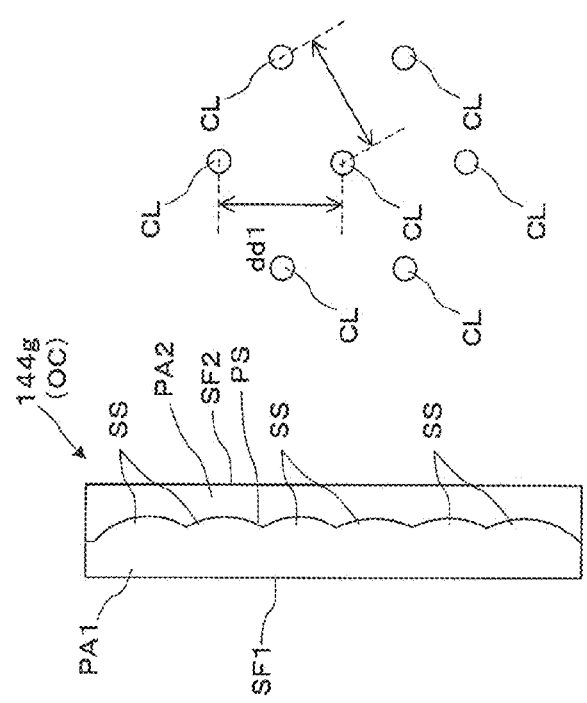
FIG. 15B
FIG. 15A

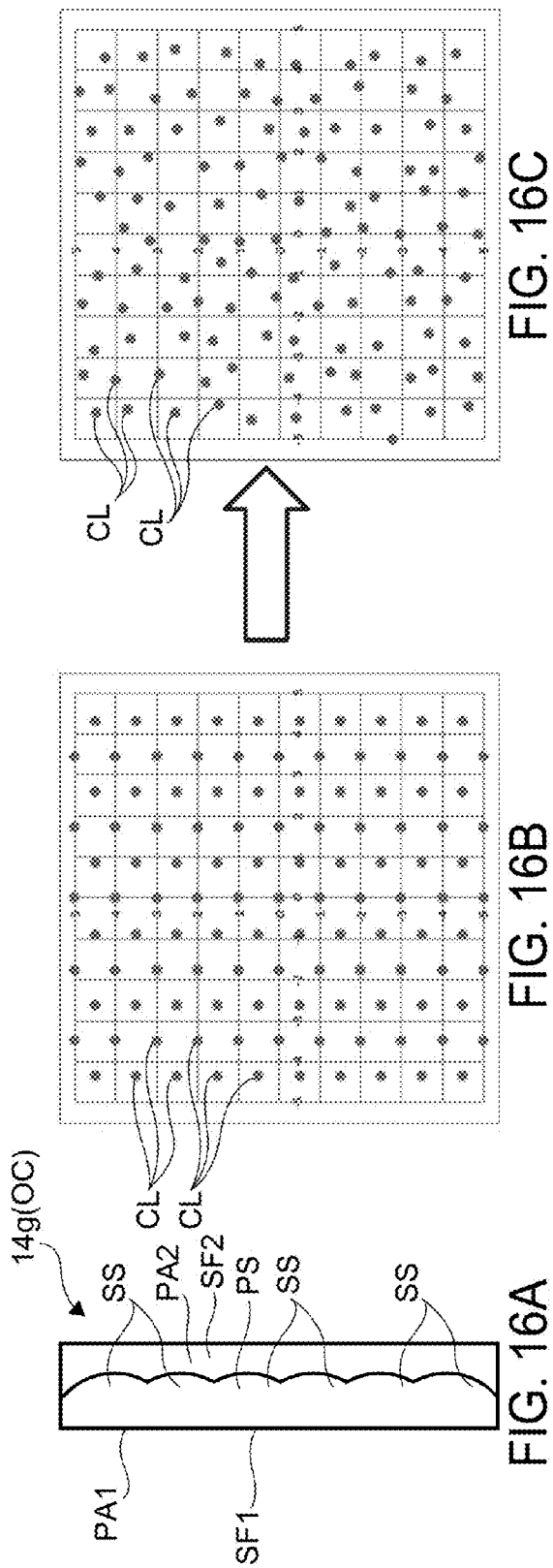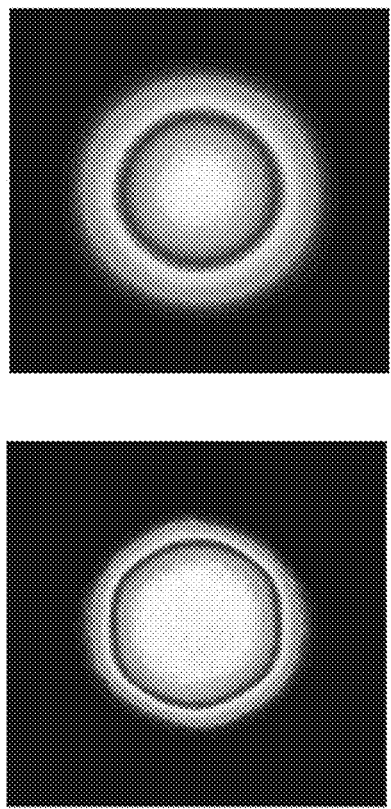
FIG. 16A  FIG. 16B  FIG. 16C  FIG. 16D  FIG. 16E

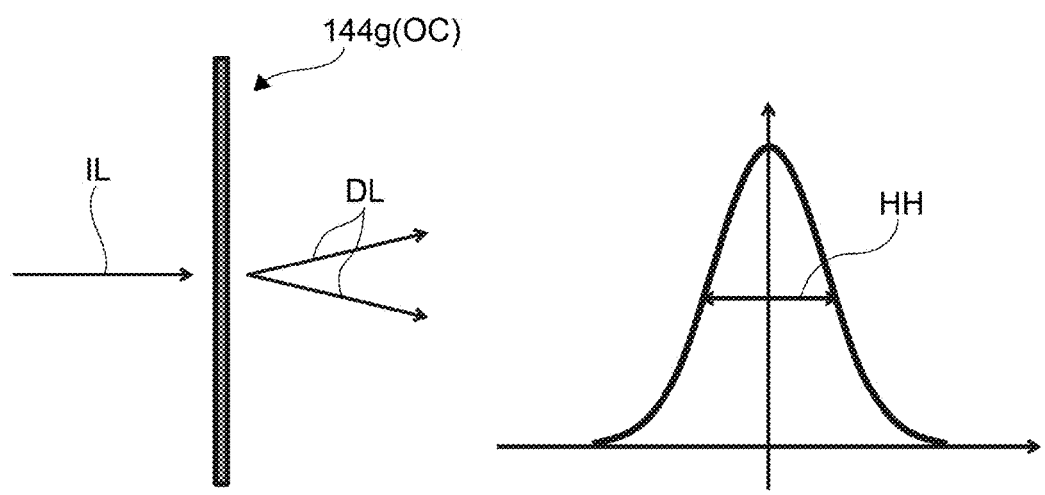
FIG. 17A          FIG. 17B
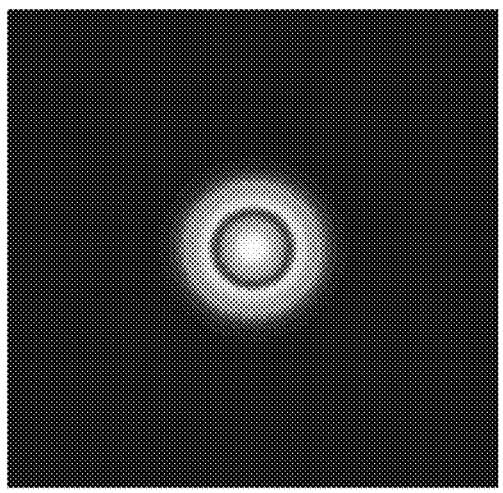 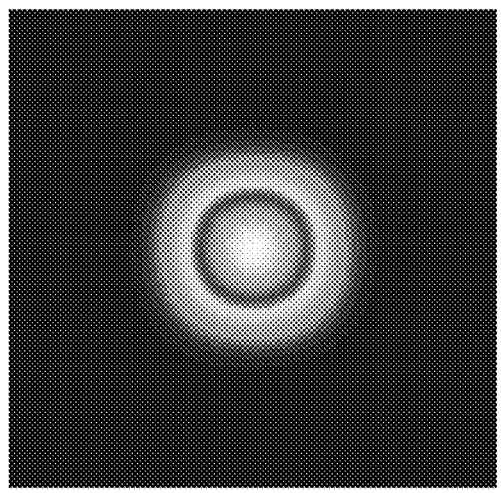
FIG. 17C          FIG. 17D

PROJECTOR

BACKGROUND

1. Technical Field

The present invention relates to a projector including a first spatial modulation element and a second spatial modulation element which are disposed in series on a light path.

2. Related Art

A projector is known in which two spatial modulation elements are arranged in series in order to increase image contrast (for example, refer to JP-A-2007-218946). In this case, a relay lens is disposed between the two spatial modulation elements, and one image of the two spatial modulation elements is superimposed on the other image so as to form an image.

In JP-A-2007-218946, two or more spatial modulation elements are disposed in series, and both spatial modulation elements are made to have a substantial image formation relationship (here, the image formation relationship indicates an arrangement relationship in which the spatial modulation elements mutually form an image) in a relay optical system. Therefore, in order to improve contrast in an image, the relay optical system does not completely superimpose one image of the two spatial modulation elements on the other image so as to form an image. Consequently, moire due to black matrices between pixels of the spatial modulation elements is minimized. In addition, in a projector, other techniques are known in which two spatial modulation elements are arranged in series so as to increase contrast in an image (refer to JP-T-2006-509244, JP-A-2005-189282, and JP-A-2005-208573). For example, in JP-T-2006-509244, when an image is formed by superimposing one image of two spatial modulation elements on the other image, a double Gauss lens is used as a relay lens.

However, for example, in JP-A-2007-218946, if a desired defocus state is to be maintained, that is, a positional relationship in which one image is not completely superimposed on the other image is to be maintained as well as making the two spatial modulation elements have a substantial image formation relationship, position accuracy (that is, manufacturing tolerance) becomes strict, and thus there is a probability that position adjustment may be difficult. Since a distribution of a defocused image (blurred image) varies depending on a variation in a distribution of light from a light source, there is a probability that an image may be disturbed due to influence of the light distribution. This also occurs in the other documents as well as JP-A-2007-218946.

SUMMARY

An advantage of some aspects of the invention is to provide a projector of a type in which two spatial modulation elements are disposed in series, and the projector performs control so that a boundary between a bright part and a dark part is inconspicuous on a screen on which an image is projected by minimizing influence of a light distribution or increasing a tolerance related to position accuracy, and thus can minimize, for example, the occurrence of moire, thereby providing a favorable image.

An aspect of the invention is directed to a projector including an illumination optical system that emits light; a light modulation device that modulates light emitted from the illumination optical system; and a projection optical system that projects light modulated by the light modulation device, in which the light modulation device includes a first pixel matrix and a second pixel matrix that are disposed in series on an optical path of the light emitted from the illumination optical system; and a relay optical system that is disposed on the optical path between the first pixel matrix and the second pixel matrix, and in which the relay optical system includes a light deflection member that is disposed at a pupil position and changes a direction of light so as to cause blurring. Here, two pixel matrices being disposed in series on the optical paths indicates that one pixel matrix (for example, the first pixel matrix) is disposed so as to be located further toward the optical path upstream side than the other pixel matrix (for example, the second pixel matrix) when a certain optical path is followed. In other words, the first pixel matrix and the second pixel matrix are relatively disposed on the optical path upstream side and the optical path downstream side. In addition, the pupil position indicates a position (that is, a position corresponding to the pupil position in the relay optical system) where an opening diaphragm is to be disposed, but, in practice, a corresponding position is also referred to as the pupil position even in a case of a configuration in which an opening diaphragm is not disposed at the pupil position.

According to the projector described above, for example, since the light deflection member is disposed at the pupil position between the first pixel matrix (the optical path upstream side) and the second pixel matrix (the optical path downstream side) which are two spatial modulation elements, a cross-section of luminous flux at an image formation position of the luminous flux which will become image light in the second pixel matrix (projected side) can be adjusted to a state of having an appropriate size (enlarged size), that is, a state in which an image is not completely formed but is blurred. In addition, in this case, an amount of blurring due to light passing through the light deflection member is constant, and a desired image can be formed by performing an image process in the two spatial modulation elements so as to compensate for the amount of blurring. In the above-described case, appropriate blurring is caused, and thus it is possible to minimize the occurrence of moire caused by black matrices between pixels of the spatial modulation elements and thus to provide a favorable image. Further, light is subdivided (diffused) by the light deflection member, and thus it is possible to form a blurred image on which the influence of a light distribution is minimized and a blurred image which does not depend on the light distribution.

In a specific aspect of the invention, the light deflection member is a light diffusion element. In this case, it is possible to form a blurred image on which the influence of a light distribution is minimized through light diffusion.

In another aspect of the invention, the light diffusion element is obtained by joining two or more materials having different light transmittances to each other. In this case, it is possible to form a desired diffusion state (for example, a state in which an extent of diffusion is made small) by using a refractive index difference due to a difference between materials.

In still another aspect of the invention, in the light diffusion element, an inner surface which is a joint surface of the two or more materials having different light transmittances has a curved shape, and outer surfaces which are a front surface and a rear surface have a planar shape. In this case, convenience of processing or installation increases, and, for example, an AR coat is easily applied to the outer surfaces.

In still another aspect of the invention, the light diffusion element is a lens array in which a plurality of lenses are arranged in a two-dimensional form. In this case, a diffusion action can be caused by division of light using the lens array.

In still another aspect of the invention, in the light diffusion element, an arrangement of the plurality of lenses is a simple tetragonal arrangement. In this case, it is possible to relatively easily manufacture an optical element in which a plurality of lenses are disposed.

In still another aspect of the invention, in the light diffusion element, an arrangement of the plurality of lenses is a hexagonal arrangement. In this case, the lenses can be disposed densely and in a state of being approximately a circular shape.

In still another aspect of the invention, in the light diffusion element, an arrangement of the plurality of lenses is a random arrangement. In this case, a diffusion action can be made to have randomness.

In still another aspect of the invention, the light diffusion element is a diffusion plate which causes Gauss scattering. In this case, a diffusion action can be made uniform.

In still another aspect of the invention, the light deflection member is a phase plate. Here, the phase plate is a light transmissive plate-shaped member which does not have a power (that is, a focal length is infinite) and has a shape for changing a phase of a wavefront.

According to the projector described above, for example, since the phase plate is disposed at the pupil position between the first pixel matrix (the optical path upstream side) and the second pixel matrix (the optical path downstream side) which are two spatial modulation elements, it is possible to adjust a state of luminous flux which will become image light. Specifically, the phase plate exhibits an action of changing a phase of a wavefront with respect to passing luminous flux, and thus a cross-section of the luminous flux at an image formation position of the luminous flux in the second pixel matrix (projected side) can be adjusted to a state of having an appropriate size (enlarged size), that is, a state in which an image is not completely formed but is blurred. In addition, the phase plate is disposed at the pupil position, and thus exhibits the above-described action with respect to the entire luminous flux which will become image light. In this case, in each beam of luminous flux, even if a slight error occurs in position accuracy in the optical axis direction, a variation in a cross-section state (size) at a position of the second pixel matrix on the projected side, due to the error, is minimized. In other words, a tolerance of an image formation position for an error increases as a result of light passing through the phase plate. In other words, a focal depth increases, and thus a manufacturing tolerance can be relaxed. In addition, in this case, an amount of blurring due to light passing through the phase plate is constant, and a desired image can be formed by performing an image process in the two spatial modulation elements so as to compensate for the amount of blurring. In the above-described case, appropriate blurring is caused, and thus it is possible to minimize the occurrence of moire caused by black matrices between pixels of the spatial modulation elements and thus to provide a favorable image. Further, for example, in a case where dimming for adjusting luminance is performed in one of the first pixel matrix and the second pixel matrix, and color modulation for forming an image is performed in the other thereof, even if there is a difference in a resolution between both of the pixel matrices, an appropriate blur is generated, and thus a location corresponding to a boundary between a bright part and a dark part on the luminance adjustment side can be made inconspicuous during projection of an image.

In a specific aspect of the invention, a surface of the phase plate has a cubic function shape in an arbitrary direction perpendicular to an optical axis and another direction intersecting the arbitrary direction. Here, a case where one direction intersects another direction includes a case where both directions are perpendicular to each other. The surface of the phase plate has, particularly, a cubic function shape, and thus a variation in a state of luminous flux can be made small along the optical axis in the vicinity of an image formation position in the optical axis direction.

In another aspect of the invention, a surface of the phase plate has a quartic function shape in an arbitrary direction perpendicular to an optical axis and another direction intersecting the arbitrary direction. In this case, it is possible to control a state of luminous flux by allowing the luminous flux to be symmetric in an arbitrary direction and another direction while minimizing a variation in a state of the luminous flux in the vicinity of the image formation position in the optical axis direction.

In still another aspect of the invention, the relay optical system is an optical system of equal magnification which is symmetric with respect to a position of the phase plate along an optical axis. In this case, since the relay optical system is symmetric with respect to a position of the diaphragm, for example, pixel matrices having substantially the same standards are used as both the two pixel matrices, and are equivalently disposed, so as to minimize coma aberration and distortion aberration and to provide a high performance relay optical system.

In still another aspect of the invention, a surface of the phase plate has the same shape in an arbitrary direction perpendicular to an optical axis and another direction intersecting the arbitrary direction. In this case, an enlarged state of a cross-section of luminous flux in the arbitrary direction and an enlarged state of a cross-section of the luminous flux in another direction can be aligned.

In still another aspect of the invention, when a pixel pitch of the first pixel matrix is set to L, magnification of the relay optical system is set to M, and a difference between blurred amounts at an image formation position of the second pixel matrix depending on the presence or the absence of the light deflection member is set to b, $ML/2 \leq b \leq 3\ ML$ is satisfied. In this case, the phase plate is present, and thus can add a size (enlarged size) to a cross-section of luminous flux at an image formation position of the second pixel matrix to necessary and sufficient extents when compared with a case where there is no phase plate.

In still another aspect of the invention, the relay optical system further includes double Gauss lenses that are disposed with the phase plate interposed therebetween along the optical path. In this case, it is possible to appropriately minimize aberration with the double Gauss lenses.

In still another aspect of the invention, the relay optical system further includes a pair of meniscus lenses that are disposed with the double Gauss lenses interposed therebetween along the optical path and each of which has a positive power. In this case, since the pair of meniscus lenses are disposed so as to be convex toward the double Gauss lenses, it is possible to further improve an aberration correction function and also to make telecentricity favorable.

In still another aspect of the invention, the projector further includes a color splitting/light guide optical system that splits the light emitted by the illumination optical system into a plurality of color light beams of different wavelength bands and guides the color light beams; a modulation optical system that is provided with a plurality of light modulation devices each of which includes the first pixel matrix, the second pixel matrix, and the relay optical system so as to correspond to the plurality of color light beams, and that modulates the plurality of color light beams split by the color splitting/light guide optical system; and a combination optical system that combines modulated light beams of respective colors which have been modulated by the modulation optical system with each other, and emits combined light toward the projection optical system. In this case, it is possible to form a color image by individually modulating a plurality of color light beams and combining the color light beams.

In still another aspect of the invention, the modulation optical system includes the plurality of light deflection members that have shapes different from each other so as to correspond to optical paths of the plurality of color light beams. In this case, for example, the optimum adjustment can be performed for each color light beam. For example, errors in each color light beam can be adjusted, and thus the light beams are combined in an optimum state.

In still another aspect of the invention, in the light modulation device, of the first pixel matrix and the second pixel matrix, a single pixel of the first pixel matrix disposed on an optical path upstream side corresponds to a plurality of pixels of the second pixel matrix disposed on an optical path downstream side. In this case, luminance can be adjusted for each area (corresponding to a plurality of pixels in the second pixel matrix) in the first pixel matrix, and luminance can be adjusted for each pixel in the second pixel matrix.

BRIEF DESCRIPTION OF THE DRAWINGS

The invention will be described with reference to the accompanying drawings, wherein like numbers reference like elements.

FIG. 4A is a diagram illustrating a state in which light is collected around an image formation position of the second pixel matrix in the embodiment, and FIG. 4B is a diagram illustrating a state in which light is collected around an image formation position of the second pixel matrix in a comparative example.

FIG. 5A is a diagram conceptually illustrating a state of a cross-section of luminous flux at an image formation position of the second pixel matrix in the embodiment, and FIG. 5B is a diagram conceptually illustrating a state of a cross-section of luminous flux at an image formation position of the second pixel matrix in a comparative example.

FIG. 6A is a diagram illustrating a variation in an extent of light collection around the image formation position of the second pixel matrix in Example 1, and FIG. 6B is a diagram illustrating a variation in an extent of light collection around the image formation position of the second pixel matrix in the comparative example.

FIG. 7A is a diagram illustrating a variation in an extent of light collection around the image formation position of the second pixel matrix in Example 2, and FIG. 7B is a diagram illustrating a variation in an extent of light collection around the image formation position of the second pixel matrix in the comparative example.

FIG. 10A is a diagram illustrating an example of a diffusion plate; FIG. 10B is a diagram illustrating an arrangement of lenses forming the diffusion plate illustrated in FIG. 10A; and FIG. 10C is a diagram illustrating a state of each small lens and a lens center in FIG. 10B.

FIG. 13A is a diagram illustrating a dot image intensity distribution on an image panel surface; FIG. 13B is a diagram illustrating a distribution of a blurred image on the image panel surface for light from a center of the dimming plane surface; FIG. 13C is a diagram illustrating a distribution of a blurred image on the image panel surface for light from an end of the dimming panel surface; FIG. 13D is a diagram illustrating a distribution of a blurred image when an in a light source is deviated; and FIGS. 13E to 13H are diagrams illustrating comparative examples respectively corresponding to FIGS. 13A to 13D.

FIG. 15A is a diagram illustrating an example of a diffusion plate of a modification example; FIG. 15B is a diagram illustrating an arrangement of lenses forming the diffusion plate illustrated in FIG. 15A; FIG. 15C is a diagram illustrating a dot image intensity distribution at the diffusion plate illustrated in FIG. 15A; and FIG. 15D is a diagram illustrating a light distribution in a blurred image at the diffusion plate illustrated in FIG. 15A.

FIG. 16A is a diagram illustrating an example of a diffusion plate of another modification example; FIGS. 16B and 16C are diagrams illustrating an arrangement of lenses forming the diffusion plate illustrated in FIG. 16A; FIG. 16D is a diagram illustrating a dot image intensity distribution at the diffusion plate illustrated in FIG. 16A; and FIG. 16E is a diagram illustrating a light distribution in a blurred image at the diffusion plate illustrated in FIG. 16A.

FIG. 17A is a diagram illustrating an example of a diffusion plate which causes Gauss scattering; FIG. 17B is a diagram illustrating a scattering distribution at the diffusion plate illustrated in FIG. 17A; FIG. 17C is a diagram illustrating a dot image intensity distribution at the diffusion plate illustrated in FIG. 17A; and FIG. 17D is a diagram illustrating a light distribution in a blurred image at the diffusion plate illustrated in FIG. 17A.

DESCRIPTION OF EXEMPLARY EMBODIMENTS

First Embodiment

Hereinafter, with reference to the drawings, a projector related to each embodiment of the invention will be described in detail.

Figure 1:
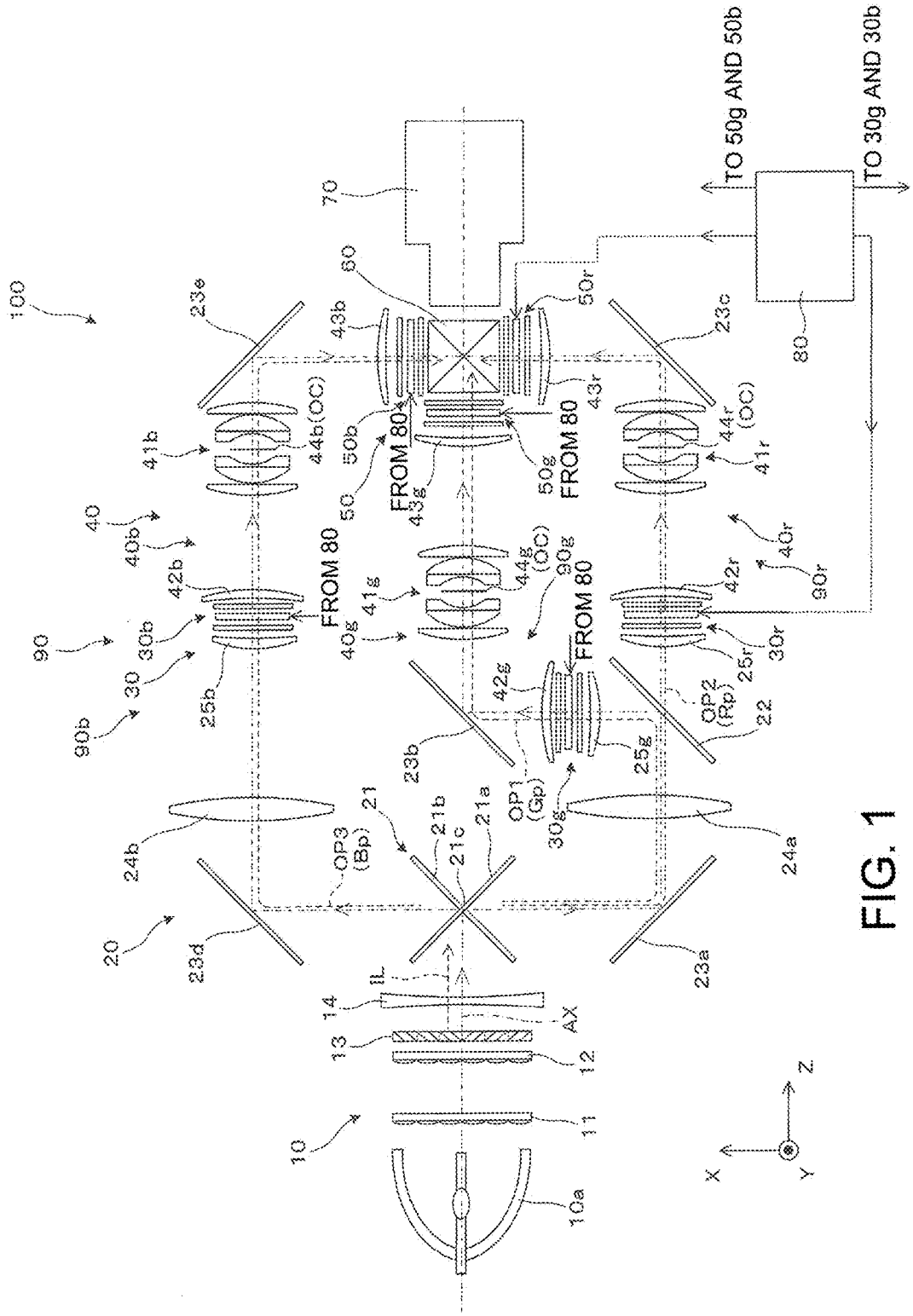
FIG. 1 is a diagram illustrating a schematic configuration of a projector according to a first embodiment or Example 1.

As illustrated in FIG. 1, a projector 100 according to a first embodiment of the invention includes an illumination optical system 10 which emits illumination light; a color splitting/light guide optical system 20 which splits the illumination light into a color light beam of each color and guides the color light beams; a modulation optical system 90 which spatially modulates each color light beam which is emitted from the illumination optical system 10 and is split by the color splitting/light guide optical system 20; a combination optical system 60 which combines the split and modulated color light beams (modulated light beams) with each other; a projection optical system 70 which projects the combined light; and a projector controller 80. Among the above-described optical systems, particularly, the modulation optical system 90 includes a dimming system 30 provided with a first pixel matrix; a relay optical system 40 which functions as a relay system between the first pixel matrix and a second pixel matrix; and an image display system 50 which includes the second pixel matrix. In addition, the projector controller 80 controls an operation of each optical system. Further, it is assumed that an optical axis for all the optical systems of the projector 100 is set to an optical axis AX, and, in FIG. 1, a plane including the optical axis AX is parallel to the XZ plane, and a direction of an emission axis of image light is set to a +Z direction.

The illumination optical system 10 includes a light source 10a; a first lens array (first integrator lens) 11 including a plurality of lens elements which are arranged in an array form; a second lens array (second integrator lens) 12; a polarization conversion element 13 which converts light from the second lens array 12 into predetermined linearly polarized light; and a superimposition lens 14. The illumination optical system 10 emits illumination light in an amount which is sufficient to form an image. In addition, the light source 10a is, for example, an ultra-high pressure mercury lamp, and emits light including R light, G light, and B light. Further, the light source 10a may be discharge light sources other than the ultra-high pressure mercury lamp, and may be a solid-state light source such as an LED or a laser source. The lens arrays 11 and 12 divide luminous flux from the light source 10a into light beams and collect the light beams, and the polarization conversion element 13 forms illumination light which is superimposed in an illuminated region of a dimming light valve constituting the dimming system 30, in cooperation with the superimposition lens 14 and condenser lenses 24a, 24b, 25g, 25r and 25b described later.

The color splitting/light guide optical system 20 includes a cross-dichroic mirror 21, a dichroic mirror 22, bending mirrors 23a, 23b, 23c, 23d and 23e, first lenses (condenser lenses) 24a and 24b, and second lenses (condenser lenses) 25g, 25r and 25b. Here, the cross-dichroic mirror 21 includes a first dichroic mirror 21a and a second dichroic mirror 21b. The first and second dichroic mirrors 21a and 21b are perpendicular to each other, and an intersection axis 21c thereof extends in the Y direction. The color splitting/light guide optical system 20 splits illumination light from the illumination optical system 10 into three color light beams of green, red, and blue, and guides each color light beam.

The modulation optical system 90 includes a plurality of light modulation devices which respectively correspond to the three split color light beams. Particularly, in the present embodiment, the modulation optical system 90 includes the dimming system 30 which is relatively located on an optical path upstream side, the image display system 50 which is relatively located on an optical path downstream side, and the relay optical system 40 which is disposed therebetween.

In the modulation optical system 90, the dimming system 30 includes three non-emissive dimming light valves 30g, 30r and 30b which respectively adjust intensities of the three color light beams corresponding to color light beams including three colors (red, green, and blue) split by the color splitting/light guide optical system 20. Each of the dimming light valves 30g, 30r and 30b includes a first pixel matrix. Specifically, each of the dimming light valves 30g, 30r and 30b includes a transmissive liquid crystal pixel matrix (liquid crystal panel) which is a main body part of the first pixel matrix, an incidence side polarization plate which is provided on a light incidence side of the first pixel matrix, and an emission side polarization plate which is provided on a light emission side of the first pixel matrix. In addition, the incidence side polarization plate and the emission side polarization plate are in a cross-nicol alignment. Hereinafter, an operation of controlling each of the dimming light valves 30g, 30r and 30b will be described briefly. First, a brightness control signal is determined from an input image signal by the projector controller 80. Next, a dimming driver (not illustrated) is controlled by the determined brightness control signal. The dimming light valves 30g, 30r and 30b are driven by the controlled dimming driver, and the intensity of each of the color light beams including three colors (red, green, and blue) is adjusted. Here, a resolution of the dimming system 30 is 250 pixels in the horizontal direction and 145 pixels in the vertical direction.

In the modulation optical system 90, the relay optical system 40 includes three optical systems 40g, 40r and 40b so as to respectively correspond to the three dimming light valves 30g, 30r and 30b constituting the dimming system 30. For example, the optical system 40g includes double Gauss lenses 41g, a pair of meniscus lenses 42g and 43g, and a phase plate 44g as a light deflection member OC. In addition, although described later in detail, the phase plate 44g has a surface with a cubic function shape, and is a light transmissive plate-shaped member which functions as a member adjusting an image formation state of light by changing a phase of a wavefront of passing light. The phase plate 44g is disposed at a central position of the double Gauss lenses 41g. As a result, the double Gauss lenses 41g are disposed with the phase plate 44g interposed therebetween on an optical path as the light deflection member OC. The pair of meniscus lenses 42g and 43g are positive lenses, and are disposed with the double Gauss lenses 41g interposed therebetween on the optical path. Each of the meniscus lenses 42g and 43g is disposed so as to be convex toward the double Gauss lenses 41g side. In other words, a convex surface thereof is directed toward the double Gauss lenses 41g side. Further, the other optical systems 40r and 40b respectively include double Gauss lenses 41r and 41b, pairs of meniscus lenses 42r, 43r, 42b and 43b, and phase plates 44r and 44b as light deflection members OC having the same structure.

In the modulation optical system 90, the image display system 50 includes non-emissive color modulation light valves 50g, 50r and 50b which respectively correspond to color light beams including three colors (red, green, and blue) having passed through the relay optical system 40 and which modulate spatial distributions of intensities of the respective color light beams which are three incident illumination light beams. Each of the color modulation light valves 50g, 50r and 50b includes a second pixel matrix which is a transmissive liquid crystal pixel matrix. Specifically, each of the color modulation light valves 50g, 50r and 50b includes a liquid crystal pixel matrix (liquid crystal panel) which is the second pixel matrix, an incidence side polarization plate which is provided on a light incidence side of the second pixel matrix, and an emission side polarization plate which is provided on a light emission side of the second pixel matrix. Hereinafter, an operation of controlling each of the color modulation light valves 50g, 50r and 50b will be described briefly. First, the projector controller 80 converts an input image signal into an image light valve control signal. Next, a panel driver (not illustrated) is controlled by the converted image light valve control signal. The three color modulation light valves 50g, 50r and 50b driven by the controlled panel driver modulate three color light beams, so as to form an image corresponding to the input image information (image signal). Here, a resolution of the image display system 50 is, for example, full HD.

In addition, the above modulation optical system 90 is constituted by three light modulation devices 90g, 90r and 90b. In other words, the light modulation device 90g is disposed so as to correspond to green light, and includes the dimming light valve 30g, the optical system 40g, and the color modulation light valve 50g. Similarly, the light modulation device 90r is disposed so as to correspond to red light, and includes the dimming light valve 30r, the optical system 40r, and the color modulation light valve 50r. In addition, the light modulation device 90b is disposed so as to correspond to blue light, and includes the dimming light valve 30b, the optical system 40b, and the color modulation light valve 50b. As mentioned above, in a case where the modulation optical system 90 is viewed in terms of the three light modulation devices 90g, 90r and 90b, in a single light modulation device (for example, the light modulation device 90g), a dimming light valve (the dimming light valve 30g) having the first pixel matrix, a relay optical system (the optical system 40g), and a color modulation light valve (the color modulation light valve 50g) having the second pixel matrix are disposed in this order along the optical path. In other words, the dimming light valve and the color modulation light valve having a correspondence relationship are disposed in series.

The combination optical system 60 is a cross-dichroic prism obtained by joining four right-angle prisms together. The combination optical system 60 combines modulated light beams of respective colors which are modulated by the color modulation light valves 50g, 50r and 50b constituting the image display system 50, and emits the combined light toward the projection optical system 70.

The projection optical system 70 projects the combined light which is modulated by the color modulation light valves 50g, 50r and 50b as a light modulation device and is further combined by the combination optical system 60, toward a subject (not illustrated) such as a screen.

Hereinafter, details of forming image light will be described. First, illumination luminous flux IL is emitted as illumination light from the illumination optical system 10. Next, in the color splitting/light guide optical system 20, the first dichroic mirror 21a of the cross-dichroic mirror 21 reflects green (G) light and red (R) light included in the illumination luminous flux IL, and transmits remaining blue (B) light therethrough. On the other hand, the second dichroic mirror 21b of the cross-dichroic mirror 21 reflects blue (B) light, and transmits green (G) light and red (R) light therethrough. The dichroic mirror 22 reflects green (G) light of the incident green and red (GR) light beams, and transmits the remaining red (R) light therethrough. The respective color light beams Gp, Rp and Bp are split from the illumination luminous flux IL by the color splitting/light guide optical system 20 along optical paths OP1 to OP3 of the respective colors. More specifically, the illumination luminous flux IL from the illumination optical system 10 is incident to the cross-dichroic mirror 21 and is split into color light beams. Among components of the illumination luminous flux IL, the green light Gp (optical path OP1) is reflected by the first dichroic mirror 21a of the cross-dichroic mirror 21 so as to branch, and is further reflected by the dichroic mirror 22 via the bending mirror 23a so as to branch and to be incident to the dimming light valve 30g corresponding to the green light Gp among the three dimming light valves of the dimming system 30. In addition, among components of the illumination luminous flux IL, the red light Rp (optical path OP2) is reflected by the first dichroic mirror 21a of the cross-dichroic mirror 21 so as to branch, and passes through the dichroic mirror 22 via the bending mirror 23a so as to branch and to be incident to the dimming light valve 30r corresponding to the red light Rp among the three dimming light valves of the dimming system 30. Further, among components of the illumination luminous flux IL, the blue light Bp (optical path OP3) is reflected by the second dichroic mirror 21b of the cross-dichroic mirror 21 so as to branch, and is incident to the dimming light valve 30b corresponding to the blue light Bp among the three dimming light valves of the dimming system 30 via the bending mirror 23d. As described above, the dimming light valves 30g, 30r and 30b constituting the dimming system 30 respectively adjust intensities of the color light beams Gp, Rp and Bp including the three colors (red, green, and blue) under the control of the projector controller 80. Furthermore, the first lenses 24a and 24b and the second lenses 25g, 25r and 25b disposed on the optical paths OP1 to OP3 are provided in order to adjust angle states of the color light beams Gp, Rp and Bp incident to the corresponding dimming light valves 30g, 30r and 30b.

The respective color light beams Gp, Rp and Bp whose luminances have been adjusted in the dimming system 30 respectively pass through the optical systems 40g, 40r and 40b which constitute the relay optical system 40 and are disposed so as to correspond to the colors, and are respectively incident to the three color modulation light valves 50g, 50r and 50b constituting the image display system 50. In other words, the green light Gp emitted from the dimming light valve 30g is incident to the color modulation light valve 50g via the optical system 40g and the bending mirror 23b. The red light Rp emitted from the dimming light valve 30r is incident to the color modulation light valve 50r via the optical system 40r and the bending mirror 23c. The blue light Bp emitted from the dimming light valve 30b is incident to the color modulation light valve 50b via the optical system 40b and the bending mirror 23e. The color modulation light valves 50g, 50r and 50b constituting the image display system 50 respectively modulate the three color light beams as described above under the control of the projector controller 80, so as to form images of respective colors. The modulated light beams of respective colors modulated by the color modulation light valves 50g, 50r and 50b are combined with each other in the combination optical system 60, so as to be projected by the projection optical system 70.

In addition, in the above case, lengths of the optical paths OP1 to OP3 of the color light beams are the same as each other, that is, have an equal optical path length.

Figure 2E:
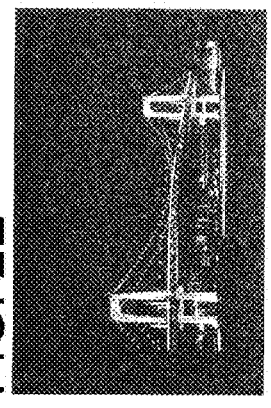
FIG. 2E is a diagram illustrating a state of an image projected by the projector.
Figure 2C:
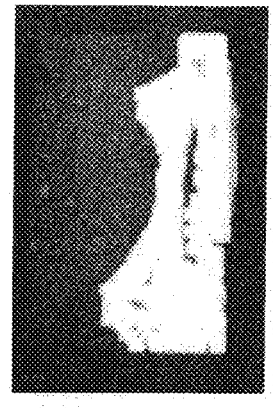
FIG. 2C is a diagram illustrating an illumination state in a second pixel matrix.
Figure 2D:
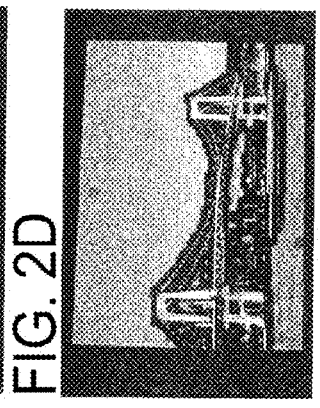
FIG. 2D is a diagram illustrating a state of an image input to the second pixel matrix.
Figure 2B:
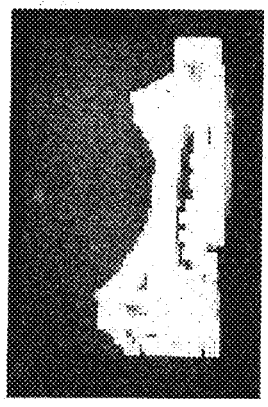
FIG. 2B is a diagram illustrating a display state in a first pixel matrix.
Figure 2F:
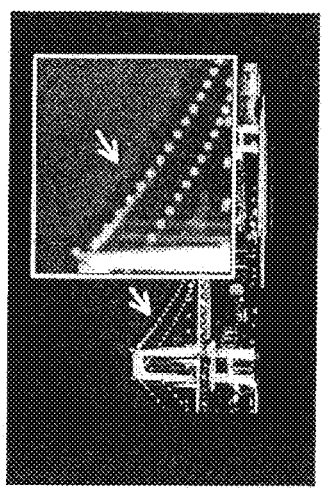
FIG. 2F is a diagram illustrating a problem due to defocus.
Figure 2A:
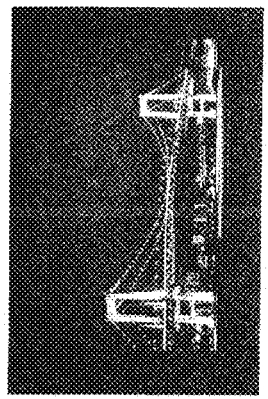
FIG. 2A is a diagram illustrating an example of an image input to the projector.

As mentioned above, in the projector 100, the corresponding first pixel matrix and second pixel matrix (for example, the pixel matrix of the dimming light valve 30g and the pixel matrix of the color modulation light valve 50g) are required to have a substantial image formation relationship. However, there is a probability that moire may occur due to a boundary (for example, black matrices) forming each pixel matrix depending on an image formation state. In the present embodiment, with respect to an input image of FIG. 2A, as an example is illustrated in FIG. 2B, in a case where the first pixel matrix (for example, the pixel matrix of the dimming light valve 30g) performs display in which a boundary part between a bright part and a dark part is clear and has no blur, the boundary part is in an appropriately blurred state in the second pixel matrix (for example, the pixel matrix of the color modulation light valve 50g) as in FIG. 2C by the light deflection member OC (the phase plate 44g), and thus moire can be minimized. This blurred state can be adjusted by changing deflection characteristics of light beams by using the light deflection member OC. In addition, an image input to the color modulation light valve having the second pixel matrix (for example, the pixel matrix of the color modulation light valve 50g) which is illuminated in the above-described state has a state, for example as in FIG. 2D on the basis of the input image illustrated in FIG. 2A. In other words, if the second pixel matrix of the color modulation light valve 50g or the like which performs the display of FIG. 2D is illuminated in the state illustrated in FIG. 2C (that is, FIG. 2C is multiplied by FIG. 2D), an image as illustrated in FIG. 2E is projected. In the present embodiment, luminous flux of respective color light beams in the second pixel matrices of the color modulation light valves 50g, 50r and 50b is appropriately enlarged by the phase plates 44g, 44r and 44b. Here, for example, if an appropriately blurred state is to be maintained by defocusing without completely forming an image, generally, position accuracy becomes strict, and thus position adjustment may be difficult. In contrast, in the present embodiment, each of the phase plates 44g, 44r and 44b has a surface with a surface shape based on a cubic function as a light passing surface, and thus an image from the first pixel matrix is in a state of not being completely formed in the second pixel matrix. Therefore, a tolerance related to position accuracy is increased. Since a blurred image is formed through an action of the phase plates 44g, 44r and 44b in which phases of wavefronts change so that an image from the first pixel matrix is in a state of not being completely formed in the second pixel matrix, the influence of a light distribution on the light source side on the blurred image is minimized. As a comparative example, in a case of FIG. 2F obtained by defocusing, a boundary line which is not present in the input image may appear. In contrast, the image projected by the projector 100 of the present embodiment is an image in which the occurrence of the phenomenon as illustrated in FIG. 2F is minimized, and an illuminance distribution is uniform.

Figure 3:
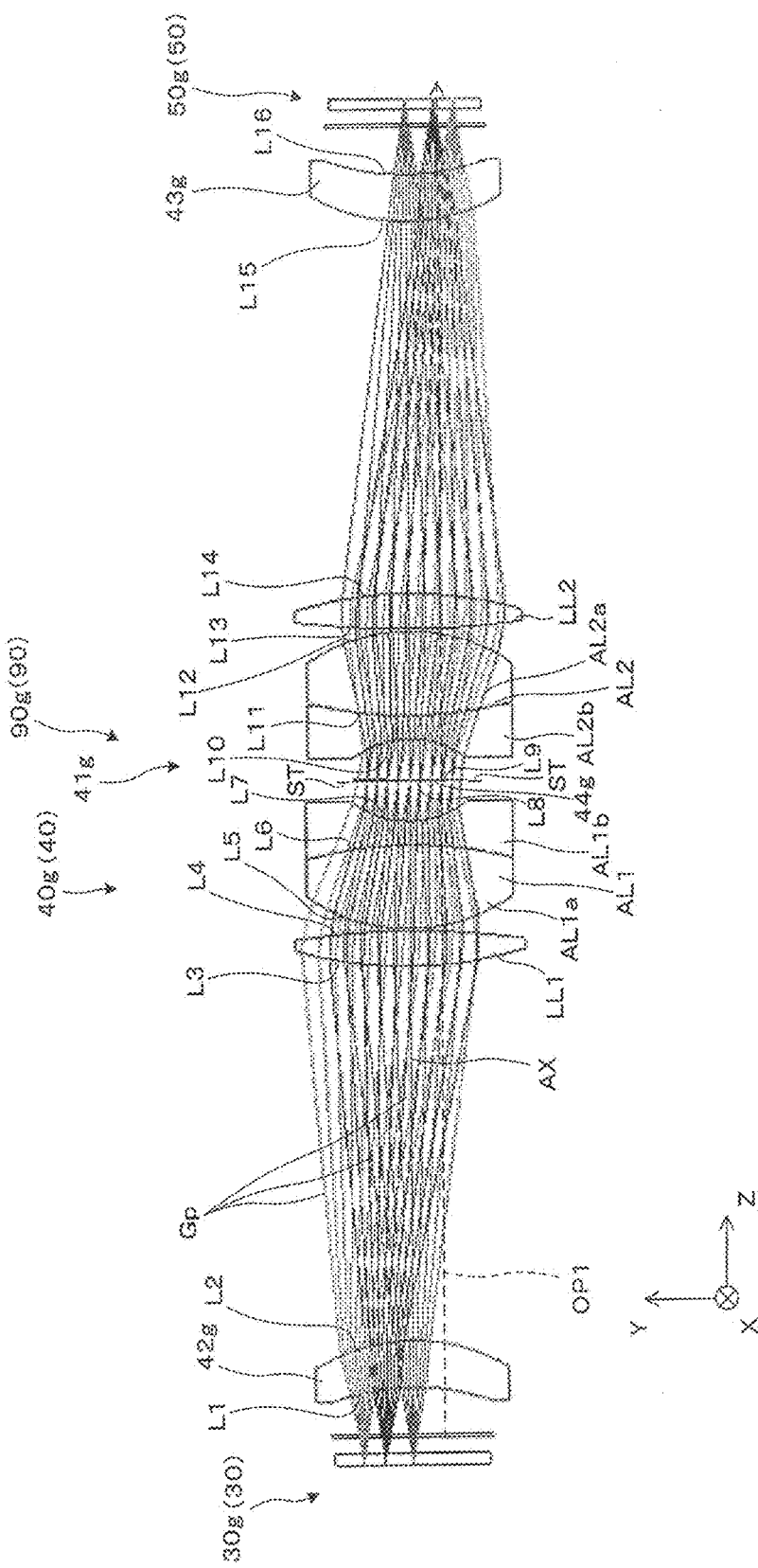
FIG. 3 is a diagram illustrating an optical path which is developed from the first pixel matrix to the second pixel matrix in the projector of FIG. 1.

FIG. 3 is a diagram illustrating an example of an optical path (for example, the optical path OP1) which is developed from the first pixel matrix to the second pixel matrix. In addition, herein, each direction of XYZ is illustrated with a traveling direction of light in the developed state as a +Z direction. Further, FIG. 3 illustrates an image formation state of illumination light (green light Gp) in relation to the dimming system 30 (the dimming light valve 30g), the relay optical system 40 (the optical system 40g), and the image display system 50 (the color modulation light valve 50g) constituting a light modulation device (in a case of the optical path OP1, the light modulation device 90g) which is the modulation optical system 90 on one optical path (for example, the optical path OP1) among the three optical paths which branch out through color splitting, particularly, with the optical system 40g constituting the relay optical system 40 as a center. In addition, as described above, in the present embodiment, the optical paths of the respective color light beams have an equal optical path length, and thus the other optical paths (for example, the optical paths OP2 and OP3) are developed in the same manner, and illustration and description thereof will be omitted.

As described above, the optical system 40g includes the double Gauss lenses 41g, the pair of meniscus lenses 42g and 43g, and the phase plate 44g. Each part of the optical system 40g will be described more in detail with reference to FIG. 3. First, the double Gauss lenses 41g are constituted by a first lens LL1, a first achromatic lens AL1, a diaphragm ST, a second achromatic lens AL2, and a second lens LL2 in this order along the optical path. In addition, each of the first achromatic lens AL1 and the second achromatic lens AL2 is formed by combining two lenses. In other words, the first achromatic lens AL1 is formed by joining a lens AL1a and a lens AL1b, and the second achromatic lens AL2 is formed by joining a lens AL2a and a lens AL2b. Therefore, each of the first achromatic lens AL1 and the second achromatic lens AL2 has a total of three lens surfaces including a front surface, a rear surface, and a joint surface.

In addition, the pair of meniscus lenses 42g and 43g are lenses having a positive refractive power and the same shape as each other, and are disposed symmetrically with respect to the double Gauss lenses 41g which are interposed therebetween. Particularly, the pair of meniscus lenses 42g and 43g are disposed so as to be convex toward the double Gauss lenses 41g side. In other words, the meniscus lens 42g which is a first meniscus lens disposed on a rear stage of the dimming light valve 30g is convex toward the optical path downstream side, and the meniscus lens 43g which is a second meniscus lens disposed on a front stage of the color modulation light valve 50g is convex toward the optical path upstream side.

The phase plate 44g is disposed at a position of the diaphragm ST on the optical path, that is, a pupil position. The phase plate 44g is a plate-shaped light transmissive member, and, more specifically, one surface thereof has a cubic function shape, and the other surface thereof has a planar shape (for example, refer to FIG. 4A). Herein, as an example of the cubic function shape, a part corresponding to a front surface of the phase plate 44g has a cubic function shape in a cross-section in an X direction (an example of arbitrary one direction) perpendicular to the direction (Z direction) of the optical axis AX and in a cross-section in a Y direction (another direction intersecting (perpendicular to) one direction). The phase plate 44g has the above-described shape, and thus exhibits an action of changing a phase of a wavefront with respect to passing luminous flux. At this time, particularly, the front surface of the phase plate 44g has the cubic function shape so as to allow a cross-section of the luminous flux to have an appropriate size (enlarged size) around an image formation position of the color modulation light valve 50g in the optical axis direction (Z direction) and also to allow a variation in a state of the luminous flux to be small in the optical axis direction around the image formation position.

Here, the optical system 40g including the phase plate 44g and the double Gauss lenses 41g is an optical system of equal magnification which is substantially symmetric along the optical axis AX with respect to a position of the diaphragm ST of the double Gauss lenses 41g. In other words, the optical system 40g has a lens arrangement configuration which is symmetric with an arrangement plane of the diaphragm ST and the phase plate 44g as a symmetry plane. In other words, in the optical system 40g, an optical system which is disposed on the optical path upstream side and an optical system which is disposed on the optical path downstream side having the same shape, material and arrangement are joined to each other in a mirror-symmetry manner with the diaphragm ST as a center.

In the optical system 40g, the meniscus lens 42g disposed on the optical path upstream side of the diaphragm ST has a lens surface L1 and a lens surface L2; the first lens LL1 has a lens surface L3 and a lens surface L4; and the first achromatic lens AL1 has a lens surface L5, a lens surface L6, and a lens surface L7. The phase plate 44g located at the position of the diaphragm ST has a lens surface L8 and a lens surface L9. In addition, in the optical system 40g, the second achromatic lens AL2 disposed on the optical path downstream side of the diaphragm. ST has a lens surface L10, a lens surface L11, and a lens surface L12; the second lens LL2 has a lens surface L13 and a lens surface L14; and the meniscus lens 43g has a lens surface L15 and a lens surface L16.

As illustrated, the green light Gp emitted from the dimming light valve 30g forms an image in the color modulation light valve 50g through the above-described respective lens surfaces L1 to L16.

FIG. 4A is a diagram conceptually illustrating a state in which light is collected around an image formation position of the color modulation light valve 50g in the present embodiment. On the other hand, FIG. 4B is a diagram related to a comparative example, and is a diagram conceptually illustrating a state in which light is collected around an image formation position of the color modulation light valve 50g in a case of a configuration in which the phase plate 44g is not provided. In other words, a typical optical system having an extent of light collection on an optical axis is illustrated. Here, in FIGS. 4A and 4B, a reference position PX indicates a position where an extent of light collection is highest around the image formation position, that is, a position (focal position) where a cross-section of luminous flux is narrowest. In contrast, a first position PX1 indicates a position which is shifted toward the optical path upstream side from the reference position PX by a distance d1 in the direction of the optical axis AX, and a second position PX2 indicates a position which is shifted toward the optical path downstream side from the reference position PX by a distance d2 in the direction of the optical axis AX. Cross-sectional shapes of the beams of luminous flux at the respective positions are indicated by cross-sections DX, DX1 and DX2. In the illustrated example, for example, in FIG. 4A, each of the cross-sections DX, DX1 and DX2 has a triangular shape, but a corresponding shape variously differs depending on a shape or the like of the phase plate 44g. In a case of FIG. 4A, an image is not completely formed even at the reference position PX, and the cross-section DX is enlarged (in a size) to some extent, that is, the image is in a state of a blur being present, and the cross-sections DX1 and DX2 scarcely change even at the positions PX1 and PX2 separated from the reference position PX by the distances d1 and d2. That is, the cross-sections of the luminous flux are maintained in a state of scarcely changing over the width of d1+d2 in the direction of the optical axis AX. In contrast, in a case of the comparative example illustrated in FIG. 4B, an extent of image formation is high, and the cross-section DX is very small, that is, there is almost no blur at the reference position PX, but the cross-section DX1 or the cross-section DX2 is larger than the cross-section DX at the position PX1 separated from the reference position PX by the distance d1 or at the position PX2 by the distance d2. In other words, this indicates that a dot image intensity distribution increases when becoming distant from the reference position PX which is a focal position in the direction of the optical axis AX, and a variation therein occurs rapidly. As illustrated in FIG. 4A, in a case of the present embodiment, a collection state of light beams scarcely changes in a range around the focal position in the direction of the optical axis AX. In other words, a blurred amount is maintained to be constant. Consequently, if an image formation position of the color modulation light valve 50g can be disposed in this range, an image process for compensation for blur can be performed on the basis of the blurred amount, and thus a desired image can be formed. In other words, in the present embodiment, since the phase plate 44g is inserted, a focal depth increases in the optical axis direction, and thus it is possible to relax position accuracy, that is, to relax a manufacturing tolerance.

FIG. 5A is a diagram conceptually illustrating a state of a cross-section of luminous flux at the image formation position of the color modulation light valve 50g, FIG. 5B is a diagram conceptually illustrating a state of a cross-section of luminous flux at the image formation position of the color modulation light valve 50g in the comparative example (refer to FIG. 4B), that is, in a case where the phase plate 44g is not provided. Herein, for convenience of description, a cross-sectional shape of the luminous flux is illustrated as a circular shape, and a size of the cross-section is indicated by a radius or a diameter of a circle. In addition, here, a pixel pitch of pixels constituting the liquid crystal panel of the dimming light valve 30g is set to L, magnification of the relay optical system 40 (the optical system 40g) is set to M, and a difference between blurred amounts at the image formation position of the color modulation light valve 50g depending on the presence and absence of the phase plate 44g is set to b. The difference b between blurred amounts is a difference between a radius of the cross-section DD1 of the luminous flux illustrated in FIG. 5A and a radius of the cross-section DD2 of the luminous flux illustrated in FIG. 5B. In other words, when a size (diameter) of a cross-section DD1 is set to a (length), and a size (diameter) of a cross-section DD2 is set to c (length), a=2b+c, that is, b=(a−c)/2. In this case, it is assumed that the pixel pitch L, the magnification M, and the blurred amount difference b satisfy ML/2≤b≤3 ML. In this case, if the phase plate 44g is present, a size (enlarged size) of the luminous flux cross-section can be made sufficiently and necessarily as described above at the image formation position of the color modulation light valve 50g when compared with a case where there is no phase plate 44g.

The content related to the optical system 40g including the above-described phase plate 44g may also be applied to the other optical systems 40r and 40b (refer to FIG. 1) which respectively constitute the relay optical system 40 and include the phase plates 44r and 44b. In this case, shapes or the like of the phase plates 44g, 44r and 44b which are respectively disposed on the corresponding optical paths may be different from each other, depending on characteristics such as wavelength bands of color light beams which pass through the optical systems 40g, 40r and 40b. In this case, for example, optimum adjustment may be performed for each color light beam. For example, errors in each color light beam can be adjusted so that the light beams are combined in an optimum state.

As described above, in the projector 100 according to the present embodiment, since the relay optical system 40 (the optical systems 40g, 40r and 40b) is provided with the phase plates 44g, 44r and 44b having the surfaces with the cubic function shapes, an action of changing only a phase of a wavefront is exhibited in passing luminous flux. Therefore, a cross-section of the luminous flux at each of the color modulation light valves 50g, 50r and 50b can be adjusted to a state of having an appropriate size (enlarged size) at an image formation position, that is, a state in which an image is not completely formed but is blurred. Consequently, moire can be minimized, and thus a favorable image can be formed.

In addition, in the above-described example, resolutions of the dimming light valves 30g, 30r and 30b constituting the dimming system 30 are lower than resolutions of the color modulation light valves 50g, 50r and 50b constituting the image display system 50, but the resolutions of the dimming light valves 30g, 30r and 30b may correspond to the resolutions of the color modulation light valves 50g, 50r and 50b in a one-to-one relationship. In other words, for example, a resolution of the dimming light valve 30g of the dimming system 30 can be made to match a resolution of the color modulation light valve 50g of the image display system 50 corresponding to the dimming light valve 30g. Further, in the above-described example, in relation to the number of grayscales (for example, 256 grayscales), the dimming light valves 30g, 30r and 30b may have the same number of grayscales as that of the color modulation light valves 50g, 50r and 50b, but the number of grayscales may be different. As described above, even if there are differences between the resolutions of the dimming light valves 30g, 30r and 30b and the resolutions of the color modulation light valves 50g, 50r and 50b, the phase plates 44g, 44r and 44b are adjusted so that an appropriate blur occurs, and thus a location corresponding to a boundary between a bright part and a dark part on a luminance adjustment side can be made inconspicuous when an image is projected.

EXAMPLES

Hereinafter, Examples of the relay optical system of the projector related to an embodiment of the invention will be described. Symbols used in each Example are summarized in the following.

R: Curvature radius of lens surface
D: Distance between lens surfaces
Nd: Refractive index of optical material for d rays
Vd: Abbe number of optical material for d rays Example 1

Data on optical surfaces constituting the relay optical system of Example 1 is shown in the following Table 1. In addition, FIGS. 1 and 3 also illustrate the lenses of Example 1. In the upper column of Table 1, a "surface number" is a number which is given to each lens surface in order from a field side. Further, "LP" added after the surface number indicates a position of a liquid crystal panel, "PP" indicates a position of a polarization plate, and "P" indicates a position of a phase plate (also a position of a diaphragm). The lower column of Table 1 specifies the lens surface L9, that is, a shape of the phase plate 44g (44r and 44b). As shown in the table, the lens surface L9 has a cubic function shape. As is clear from the right column of Table 1, herein, the lens surface L9 has the same shape in the X direction which is an arbitrary direction and the Y direction which is another direction intersecting (perpendicular to) the X direction.

TABLE 1

| Surface Number | Surface Type | Curvature Radius (R) | Surface Interval (D) | Nd | vd |
|---|---|---|---|---|---|
| 1(LP) | Spherical | ∞ | 2.3 | 1.51680 | 64.17 |
| 2 | Spherical | ∞ | 3.5 | | |
| 3(PP) | Spherical | ∞ | 0.7 | 1.51680 | 64.17 |
| 4 | Spherical | ∞ | 10 | | |
| 5 | Spherical | −50 | 10 | 1.84666 | 23.8 |
| 6 | Spherical | −39.90464771 | 80 | | |
| 7 | Spherical | 88.4492419 | 7.5 | 1.83481 | 42.7 |
| 8 | Spherical | −172.26033 | 0.5 | | |
| 9 | Spherical | 38.48404623 | 18 | 1.74320 | 49.3 |
| 10 | Spherical | −88.8156908 | 5 | 1.74000 | 28.3 |
| 11 | Spherical | 20.56405969 | 8.7 | | |
| 12(P) | Spherical | ∞ | 0.1 | 1.51680 | 64.17 |
| 13 | XY Polynomial Surface | ∞ | 8.7 | | |
| 14 | Spherical | −20.56917397 | 5 | 1.74000 | 28.3 |
| 15 | Spherical | 89.5946754 | 18 | 1.74320 | 49.3 |
| 16 | Spherical | −38.48404623 | 0.5 | | |
| 17 | Spherical | 172.26033 | 7.5 | 1.83481 | 42.7 |
| 18 | Spherical | −88.4492419 | 80 | | |
| 19 | Spherical | 39.90464771 | 10 | 1.84666 | 23.8 |
| 20 | Spherical | 50 | 10 | | |
| 21(PP) | Spherical | ∞ | 0.7 | 1.51680 | 64.17 |
| 22 | Spherical | ∞ | 3.5 | | |
| 23(LP) | Spherical | ∞ | 2.3 | 1.51680 | 64.17 |
| 24 | Spherical | ∞ | 0 | | |

| | |
|---|---|
| X, Y Curvature Radius | 1.00E+18 |
| Normalized Radius | 0 |
| Conic Constant | 0 |
| X | 0 |
| Y | 0 |
| X**2 | 0 |
| X * Y | 0 |
| Y**2 | 0 |
| X**3 | 1.00E−05 |
| X**2 * Y | 0 |
| X Y**2 | 0 |
| Y**3 | 1.00E−05 |
| X**4 | 0 |
| X**3 * Y | 0 |
| X**2 * Y**2 | 0 |
| X * Y**3 | 0 |
| Y**4 | 0 |

Figures 6A, 6B:
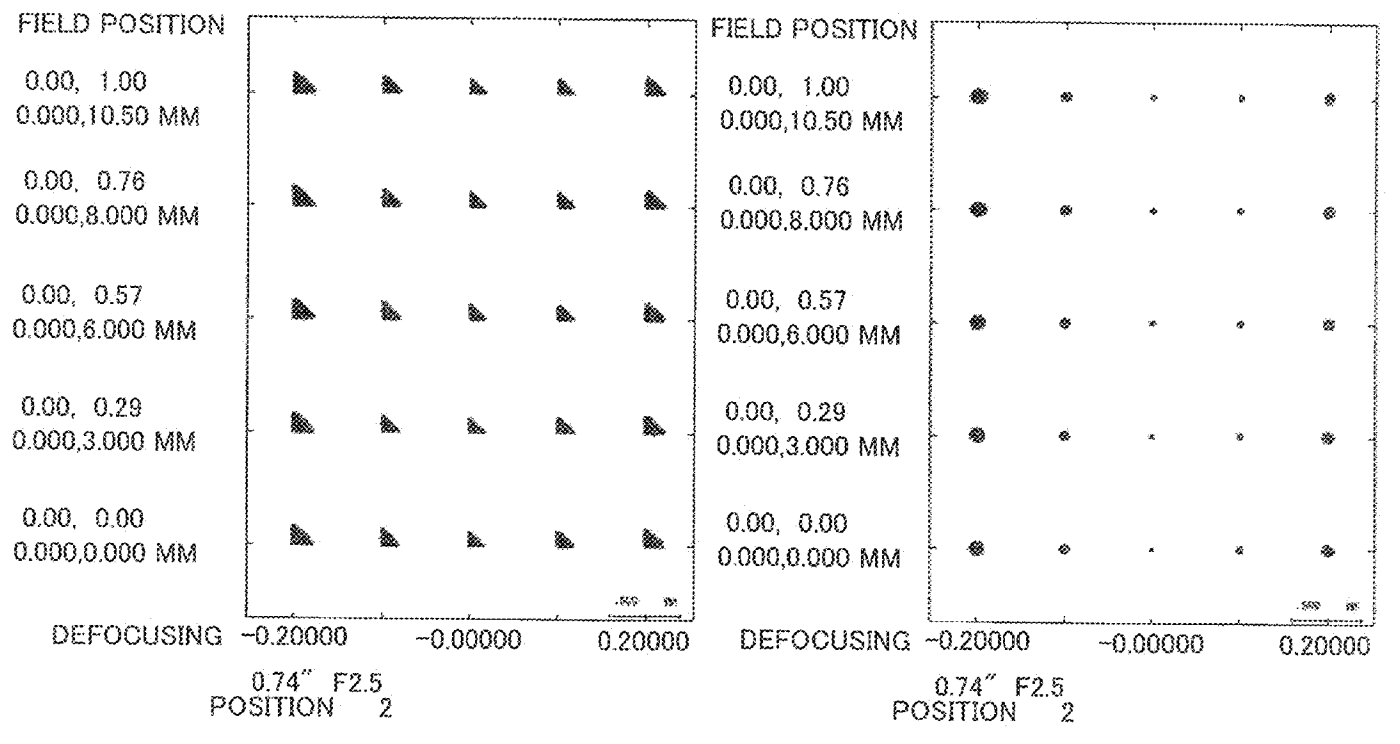

FIG. 6A is a spot diagram made by the relay optical system (the optical system 40g) in the present example. In other words, FIG. 6A illustrates a variation in an extent of light collection. The transverse axis expresses a defocus amount, and the longitudinal axis expresses an image height and indicates a distance from the optical axis. In addition, the unit of both of the longitudinal axis and the transverse axis is mm. The center (the third spot) on the transverse axis corresponds to the reference position PX of FIG. 4A. The lowermost end on the longitudinal axis corresponds to image height zero, that is, a position on the optical axis. Further, FIG. 6B is a spot diagram made by the relay optical system (the optical system 40g) in the comparative example, that is, in a case of the configuration in which the phase plate 44g is not inserted therein. As can be seen from FIGS. 6A and 6B, in a case of the present example, the spot diagram shows a nearly uniform form regardless of the image height and the defocus amount when compared with the comparative example. In other words, it can be seen that, since the phase plate 44g is inserted, a focal depth increases, and position accuracy of the image panel and the dimming panel in the optical axis direction is relaxed.

Example 2

Data on optical surfaces constituting the relay optical system of Example 2 is shown in the following Table 2. Each symbol in the upper column of Table 2 is the same as that of Example 1. In the present example, as shown in the lower column of Table 2, there is a difference from Example 1 in that the lens surface L9, that is, the phase plate 44g (44r and 44b) has a quartic function shape. In Example 2, the phase plate 44g (44r and 44b) has a rotational symmetric shape.

TABLE 2

| Surface Number | Surface Type | Curvature Radius (R) | Surface Interval (D) | Nd | vd |
|---|---|---|---|---|---|
| 1(LP) | Spherical | ∞ | 2.3 | 1.51680 | 64.17 |
| 2 | Spherical | ∞ | 3.5 | | |
| 3(PP) | Spherical | ∞ | 0.7 | 1.51680 | 64.17 |
| 4 | Spherical | ∞ | 10 | | |
| 5 | Spherical | −50 | 10 | 1.84666 | 23.8 |
| 6 | Spherical | −39.90464771 | 80 | | |
| 7 | Spherical | 88.4492419 | 7.5 | 1.83481 | 42.7 |
| 8 | Spherical | −172.26033 | 0.5 | | |
| 9 | Spherical | 38.48404623 | 18 | 1.74320 | 49.3 |
| 10 | Spherical | −88.8156908 | 5 | 1.74000 | 28.3 |
| 11 | Spherical | 20.56405969 | 8.7 | | |
| 12(P) | Spherical | ∞ | 0.1 | 1.51680 | 64.17 |
| 13 | Aspherical | ∞ | 8.7 | | |
| 14 | Spherical | −20.56917397 | 5 | 1.74000 | 28.3 |
| 15 | Spherical | 89.5946754 | 18 | 1.74320 | 49.3 |
| 16 | Spherical | −38.48404623 | 0.5 | | |
| 17 | Spherical | 172.26033 | 7.5 | 1.83481 | 42.7 |
| 18 | Spherical | −88.4492419 | 80 | | |
| 19 | Spherical | 39.90464771 | 10 | 1.84666 | 23.8 |
| 20 | Spherical | 50 | 10 | | |
| 21(PP) | Spherical | ∞ | 0.7 | 1.51680 | 64.17 |
| 22 | Spherical | ∞ | 3.5 | | |
| 23(LP) | Spherical | ∞ | 2.3 | 1.51680 | 64.17 |
| 24 | Spherical | ∞ | 0 | | |

| | |
|---|---|
| X, Y Curvature Radius | 1.00E+18 |
| Conic Constant (K) | 0 |
| 4th order Coefficient (A) | 1.00E−06 |
| 6th order Coefficient (B) | 0 |
| 8th order Coefficient (C) | 0 |
| 10th order Coefficient (D) | 0 |
| 12th order Coefficient (E) | 0 |
| 14th order Coefficient (F) | 0 |
| 16th order Coefficient (G) | 0 |
| 18th order Coefficient (H) | 0 |
| 20th order Coefficient (J) | 0 |

FIG. 7A is a spot diagram made by the relay optical system (the optical system 40g) in the present example. In addition, FIG. 7B is a spot diagram made by the relay optical system (the optical system 40g) in the comparative example, that is, in a case of the configuration in which the phase plate 44g is not inserted therein. As can be seen from FIGS. 7A and 7B, also in a case of the present example, the spot diagram shows a nearly uniform form regardless of the image height and the defocus amount when compared with the comparative example. In other words, it can be seen that, since the phase plate 44g is inserted, a focal depth increases, and position accuracy of the image panel and the dimming panel in the optical axis direction is relaxed. In a case of the present example, a shape of the spot diagram, that is, a cross-section of the luminous flux has a round shape.

Second Embodiment

Figure 8:
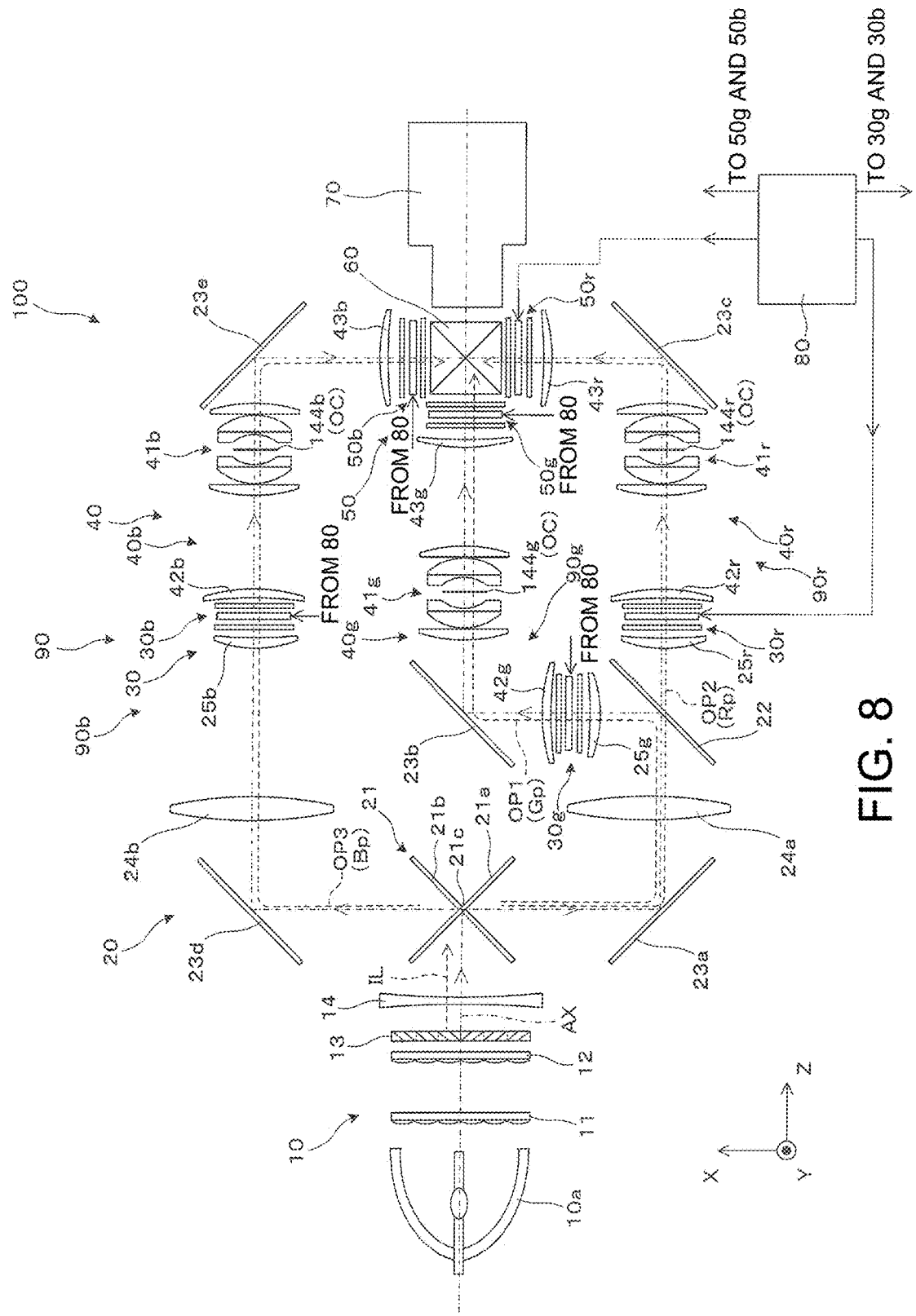
FIG. 8 is a diagram illustrating a schematic configuration of a projector according to a second embodiment.

With reference to FIG. 8 and the like, a projector according to a second embodiment of the invention will be described in detail. The projector illustrated in FIG. 8 is the same as the projector illustrated in FIG. 1 except that a structure of the light deflection member OC is different from that of the light deflection member OC described in the first embodiment, and thus description of other parts will be omitted.

In the projector 100 illustrated in FIG. 8, for example, the optical system 40g includes double Gauss lenses 41g, a pair of meniscus lenses 42g and 43g, and a light diffusion element 144g as a light deflection member OC. Although described later in detail, the light diffusion element 144g is a light transmissive plate-shaped member which functions as a member adjusting an image formation state of light by diffusing light. The light diffusion element 144g is disposed at a central position of the double Gauss lenses 41g. As a result, the double Gauss lenses 41g are disposed with the light diffusion element 144g interposed therebetween on an optical path. The pair of meniscus lenses 42g and 43g are positive lenses, and are disposed with the double Gauss lenses 41g interposed therebetween on the optical path. Each of the meniscus lenses 42g and 43g is disposed so as to be convex toward the double Gauss lenses 41g side. In other words, a convex surface thereof is directed toward the double Gauss lenses 41g side. Further, the other optical systems 40r and 40b respectively include double Gauss lenses 41r and 41b, pairs of meniscus lenses 42r, 43r, 42b and 43b, and light diffusion elements 144r and 144b, having the same structure.

Here, for example, in relation to an image formation state in the color modulation light valve 50g or the like, if an appropriately blurred state is to be maintained without completely forming an image, generally, position accuracy becomes strict, and thus position adjustment may be difficult. In contrast, in the present embodiment, each of the light diffusion elements 144g, 144r and 144b has a light diffusion characteristic, and thus an image from the first pixel matrix is in a state of not being completely formed in the second pixel matrix. Therefore, a tolerance related to position accuracy is increased.

Figure 9:
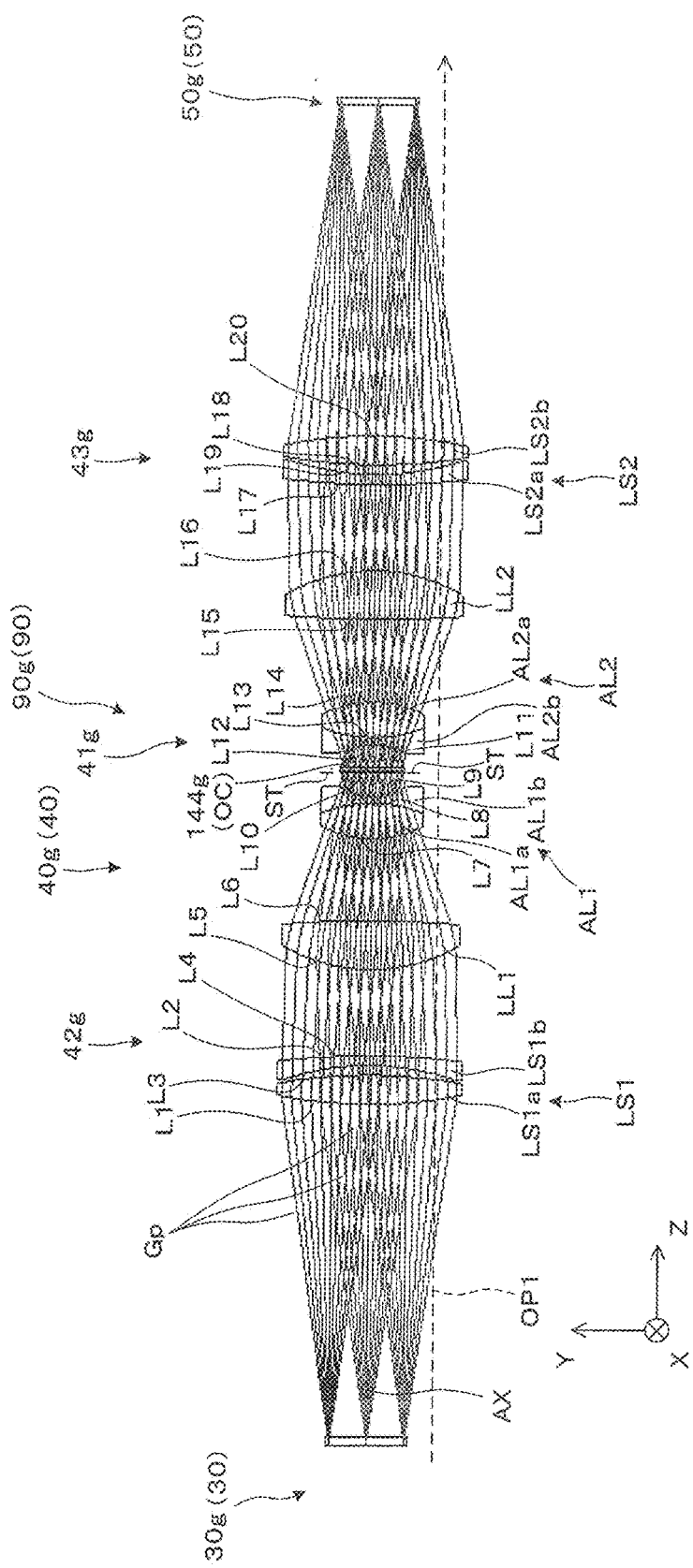
FIG. 9 is a diagram illustrating an optical path which is developed from a first pixel matrix to a second pixel matrix in the projector of FIG. 8.

FIG. 9 is a diagram illustrating an example of an optical path (for example, the optical path OP1) which is developed from the first pixel matrix to the second pixel matrix. In addition, herein, each direction of XYZ is illustrated with a traveling direction of light in the developed state as a +Z direction. Further, FIG. 9 illustrates an image formation state of illumination light (green light Gp) in relation to the dimming system 30 (the dimming light valve 30g), the relay optical system 40 (the optical system 40g), and the image display system 50 (the color modulation light valve 50g) constituting a light modulation device (in a case of the optical path OP1, the light modulation device 90g) which is the modulation optical system 90 on one optical path (for example, the optical path OP1) among the three optical paths which branch out through color splitting, particularly, with the optical system 40g constituting the relay optical system 40 as a center. In addition, as described above, in the present embodiment, the optical paths of the respective color light beams have an equal optical path length, and thus the other optical paths (for example, the optical paths OP2 and OP3) are developed in the same manner, and illustration and description thereof will be omitted.

As described above, the optical system 40g includes the double Gauss lenses 41g, and the light diffusion element 144g. In addition, herein, the optical system 40g includes a pair of first and second lens groups LS1 and LS2 in addition to the above-described constituent elements.

Each part of the optical system 40g will be described more in detail with reference to FIG. 9. First, the double Gauss lenses 41g are constituted by a first lens LL1, a first achromatic lens AL1, a diaphragm ST, a second achromatic lens AL2, and a second lens LL2 in this order along the optical path. In addition, each of the first achromatic lens AL1 and the second achromatic lens AL2 is formed by combining two lenses. In other words, the first achromatic lens AL1 is formed by joining a lens AL1$a$ and a lens AL1$b$, and the second achromatic lens AL2 is formed by joining a lens AL2$a$ and a lens AL2$b$. Therefore, each of the first achromatic lens AL1 and the second achromatic lens AL2 has a total of three lens surfaces including a front surface, a rear surface, and a joint surface.

In addition, the pair of first and second lens groups LS1 and LS2 are lenses having a positive refractive power as a whole and the same shape as each other, and are disposed symmetrically with respect to the double Gauss lenses 41$g$ with the double Gauss lenses 41$g$ interposed therebetween. The first lens group LS1 is constituted by a convex lens LS1$a$ and a meniscus lens LS1$b$, and the second lens group LS2 is also constituted by a convex lens LS2$a$ and a meniscus lens LS2$b$. The pair of lens groups LS1 and LS2 may be viewed as one functioning as a pair of meniscus lenses, and, particularly, when viewed as meniscus lenses, the meniscus lenses are disposed so as to be convex toward the double Gauss lenses 41$g$ side. In other words, the first lens group LS1 which is a first meniscus lens disposed on a rear stage of the dimming light valve 30$g$ is convex toward the optical path downstream side, and the second lens group LS2 which is a second meniscus lens disposed on a front stage of the color modulation light valve 50$g$ is convex toward the optical path upstream side. As described above, the pair of lens groups LS1 and LS2, or the constituent elements thereof function as a pair of meniscus lenses 42$g$ and 43$g$.

The light diffusion element 144$g$ is disposed at a position of the diaphragm ST on the optical path, that is, a pupil position. The light diffusion element 144$g$ is a plate-shaped light transmissive member, and, more specifically, is a member in which two materials having different light transmittance are joined together, an inner surface which is a joint surface has a curved shape, and outer surfaces which are a front surface and a rear surface have a planar shape (for example, refer to FIG. 10A).

Hereinafter, with reference to FIGS. 10A to 10C, a shape and a structure of the light diffusion element 144$g$ will be described more in detail. First, as illustrated in FIG. 10A, the light diffusion element 144$g$ is a member with a plate shape in appearance as a result of a first base material PA1 and a second base material PA2 made of different resin materials being joined to each other. More specifically, the first base material PA1 is made of, for example, a glass material, and, as illustrated, has one surface with a structure in which a plurality of lenses are arranged, that is, a multi-lens array structure, and the other surface with a planar shape. On the other hand, the second base material PA2 is made of, for example, a resin material such as an acrylic resin, and is formed, as illustrated, so as to bury the multi-lens array structure in accordance with the shape of the first base material PA1. As a result, the entire light diffusion element 144$g$ has a curved joint surface PS as an inner surface, and has a plate shape in which a front surface SF1 and a rear surface SF2 forming the outer surfaces are planar. In addition, AR coats for antireflection may be formed on the front surface SF1 and the rear surface SF2. For example, an extent of diffusion is in a state of being small by using a refractive index difference between the first base material PA1 and the second base material PA2, and thus a desired diffusion state can be obtained in the surface of the color modulation light valve 50$g$.

Here, in the light diffusion element 144$g$, as an example of the multi-lens array arrangement, a simple tetragonal arrangement is illustrated in FIGS. 10B and 10C. In other words, as illustrated in FIGS. 10B and 10C, distances dd1 between lens centers CL of respective small lenses SS constituting the multi-lens array are the same (for example, dd1=1 mm) in the horizontal direction and vertical direction and thus gaps therebetween are constant, and the square small lenses SS each of which has 1 mm as a length LP of one side in a plan view are arranged in a lattice form. A lens radius of each small lens SS is, for example, 8 mm. The light diffusion element 144$g$ has the above-described structure and thus exhibits an action of dividing (diffusing) light with respect to passing luminous flux. Consequently, a cross-section of the luminous flux has an appropriate size (enlarged size) around an image formation position of the color modulation light valve 50$g$ in the optical axis direction (Z direction), and an illuminance distribution of the enlarged light can be uniform (even) regardless of a light distribution on an illumination light side.

Referring to FIG. 9 again, the optical system 40$g$ including the light diffusion element 144$g$ and the double Gauss lenses 41$g$ is an optical system of equal magnification which is substantially symmetric along the optical axis AX with respect to a position of the diaphragm ST of the double Gauss lenses 41$g$. In other words, the optical system 40$g$ has a lens arrangement configuration which is symmetric with an arrangement plane of the diaphragm ST and the light diffusion element 144$g$ as a symmetry plane. In other words, in the optical system 40$g$, an optical system which is disposed on the optical path upstream side and an optical system which is disposed on the optical path downstream side having the same shape, material and arrangement are joined to each other in a mirror-symmetry manner with the diaphragm ST as a center.

In the optical system 40$g$, the first lens group LS1 disposed on the optical path upstream side of the diaphragm ST has a lens surface L1, a lens surface L2, a lens surface L3, and a lens surface L4; the first lens LL1 has a lens surface L5 and a lens surface L6; and the first achromatic lens AL1 has a lens surface L7, a lens surface L8, and a lens surface L9. The light diffusion element 144$g$ located at the position of the diaphragm ST has a lens surface L10 and a lens surface L11. In addition, in the optical system 40$g$, the second achromatic lens AL2 disposed on the optical path downstream side of the diaphragm ST has a lens surface L12, a lens surface L13, and a lens surface L14; the second lens LL2 has a lens surface L15 and a lens surface L16; and the second lens group LS2 has a lens surface L17, a lens surface L18, a lens surface L19, and a lens surface L20.

As illustrated in FIG. 9, the green light Gp emitted from the dimming light valve 30$g$ forms an image in the color modulation light valve 50$g$ through the above-described respective lens surfaces L1 to L20.

Figure 11A:
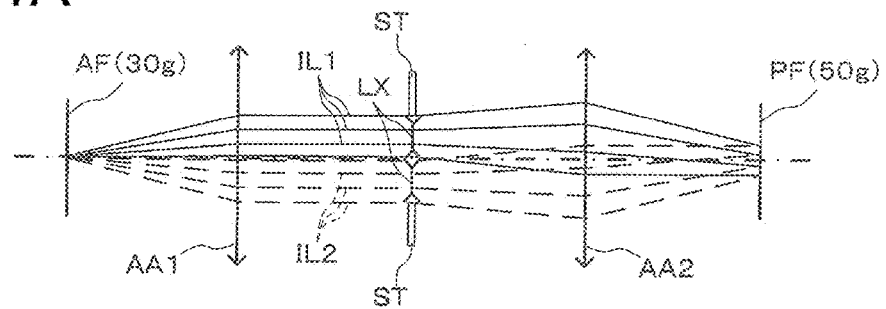
FIGS. 11A and 11B are diagrams illustrating an action of light deflection by the diffusion plate.

Hereinafter, with reference to FIGS. 11A to 11C and the like, a description will be made of a principle in which an illuminance distribution of light does not depend on a light distribution (or the influence thereof is minimized) on an illumination light side by an action of the light diffusion element 144$g$ which divides (diffuses) passing light. Each diagram of FIGS. 11A to 11C conceptually illustrates an optical path, and, for example, in relation to lens groups AA1 and AA2 shown in both directions, the lens group AA1 indicates a lens group which is located further toward a light source side (front stage side) than the diaphragm ST, and the lens group AA2 indicates a lens group which is located further toward a screen side (rear stage side) than the diaphragm ST. First, as conceptually illustrated in FIG. 11A, if two (in an entire plane, for example, four) lenses LX (herein, concave lenses) are disposed at a position (pupil position) of the diaphragm ST, the lenses LX on the pupil plane diffract passing light, and an image panel surface PF of the color modulation light valve 50g is irradiated with the light. At this time, as illustrated, among components of light emitted from a central point on a dimming panel surface AF of the dimming light valve 30g side which is an illumination side, components IL1 which are indicated by solid lines and pass on the upper side of FIG. 11A and components IL2 which are indicated by dashed lines and pass on the lower side of FIG. 11A are applied to the image panel surface PF in a combined state through actions in the respective lenses LX. This indicates that, even if biasing has an influence on a light distribution in which, for example, light of the component IL1 is relatively weak and light of component IL2 is relatively strong with respect to light from the dimming panel surface AF, such strong and weak components are combined with each other on the image panel surface PF so as to be averaged (uniformized).

Figure 11B:
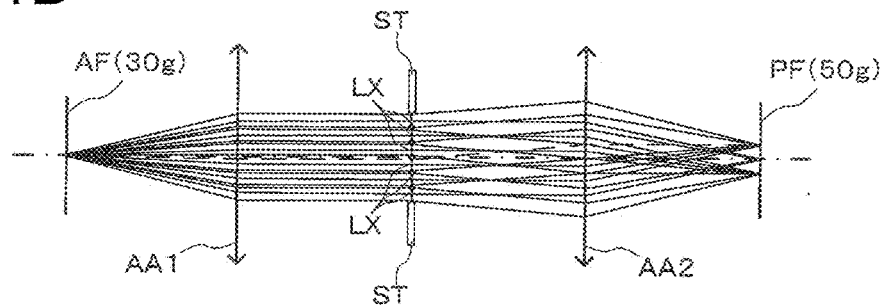
Figure 11C:
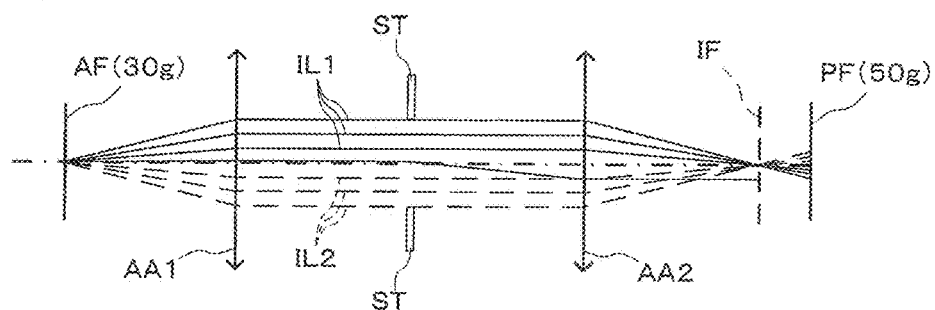
FIG. 11C is a diagram of a comparative example.
Figure 12A:
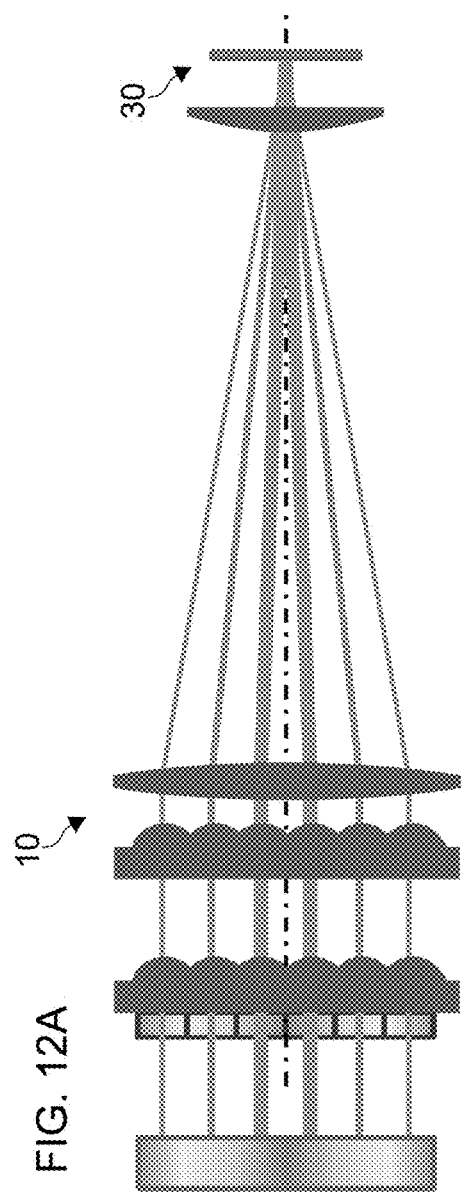
FIGS. 12A and 12B are diagrams illustrating a light distribution around an optical axis in a dimming panel surface.
Figure 12B:
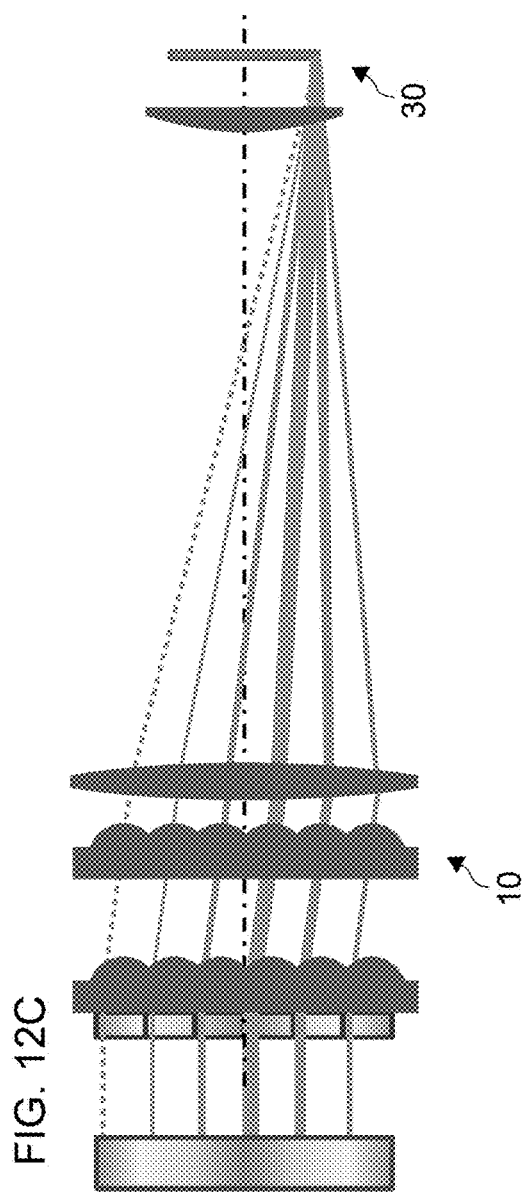
Figure 12C:
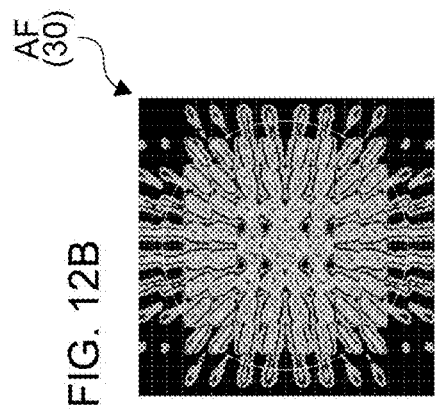
FIGS. 12C and 12D are diagrams illustrating a light distribution on a peripheral side in the dimming panel surface.
Figure 12D:
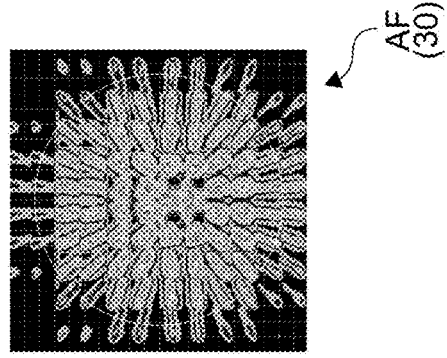

In addition, as illustrated in FIG. 11B, in a case where the number of lenses LX disposed at the position (pupil position) of the diaphragm ST is increased, a component of light emitted from a central point on the dimming panel surface AF is subdivided into components, which are then applied on the image panel surface PF in a state of being combined to each other. As described above, as in the present embodiment, the light diffusion element 144g which exhibits a diffusion action is inserted at the position (pupil position) of the diaphragm ST, and thus light emitted from each point of the dimming panel surface AF is subdivided (diffused) into light beams in the light diffusion element 144g, and the light beams form a blurred image whose illuminance is uniformized on the image panel surface PF in a state of being appropriately combined with each other. Therefore, even in a case where a light distribution is biased on the dimming light valve 30g side which is an emission side, and the light source side, the influence of the light distribution does not occur or can be reduced on the image panel surface PF of the color modulation light valve 50g through the action in the light diffusion element 144g. As illustrated in FIG. 11C as a comparative example, if the above-described member exhibiting a diffusion action is not provided at the pupil position, the components IL1, indicated by solid lines, passing on the upper side of FIG. 11C and the components IL2, indicated by dashed lines, passing on the lower side of FIG. 11C are applied on the image panel surface PF without being combined with each other. In this case, as illustrated, even if the position of the image panel surface PF is shifted from an image formation position IF in the optical axis direction (Z direction) so that defocusing occurs, thereby forming a blurred image, intensities of the components IL1 and the components IL2 have influences on the blurred images as they are. In the present embodiment, this situation can be prevented.

In addition, as exemplified in FIGS. 12A to 12D, in illumination of the dimming light valve 30g with light source light, since light distributions are different in the vicinity of the optical axis and on a peripheral side in the dimming panel surface AF, components of light emitted from the dimming panel surface AF toward the image panel surface PF have biased light distributions.

Hereinafter, with reference to FIGS. 13A to 13H, an illuminance distribution on the image panel surface of the present embodiment will be described. First, in FIGS. 13A to 13D, for example, FIG. 13A is a diagram illustrating a dot image intensity distribution on the image panel surface PF of the color modulation light valve 50g, in which the left side illustrates an illuminance distribution and the right side is a graph of the distribution. In addition, this is also the same for the other diagrams of FIGS. 13B to 13H, and an illuminance distribution illustrated on the left side is illustrated as a graph on the right side. In the present embodiment, as described above, through the action in the light diffusion element 144g, the dot image intensity distribution indicating an intensity distribution from a dot light source for the image panel surface PF has a state of being uniformly enlarged as illustrated. Herein, as illustrated in FIGS. 10A to 10C, the simple tetragonal arrangement is given, and thus a shape of the dot image intensity distribution is a rectangular shape. Further, as illustrated in FIG. 13B, a distribution of a blurred image on the image panel surface for light from a single pixel at the center in the dimming panel surface AF has a shape obtained by adding states of FIG. 13A together. Similarly, as illustrated in FIG. 13C, a distribution of a blurred image on the image panel surface for light from a single pixel at an end (peripheral side) of the dimming panel surface AF also has a state which is substantially the same as the state illustrated in FIG. 13B. This is also the same for cases of positions other than the case exemplified in FIG. 13B or 13C. In other words, the distribution shape does not change regardless of a position on the image panel surface PF. As in the cases of FIG. 13B and FIG. 13C, a case where there is no difference regardless of a position will be described later with reference to FIGS. 14A and 14B.

As illustrated in FIG. 13D, in a case of the present embodiment, even if an arc position is deviated in a light source due to deterioration or the like caused by, for example, a manufacturing tolerance or the duration of use, a distribution shape does not change.

Hereinafter, a comparative example illustrated in FIGS. 13E to 13H will be described. FIGS. 13E to 13H are diagrams illustrating a case where the light diffusion element 144g is not provided as in the present embodiment, but adjustment is performed by deviating a position in the optical axis direction (Z direction) so as to perform defocusing, and respectively correspond to FIGS. 13A to 13D. For example, FIG. 13E is a diagram illustrating a dot image intensity distribution on the image panel surface. In this case, since there is no diffusion action in a light diffusion element, a shape of the dot image intensity distribution is not the top hat shape as in the graph illustrated in FIG. 13A of the present embodiment, but is a shape of a light distribution from multiple lenses. It can be seen that a streak is included in a blurred image in the distribution of the blurred image of a single pixel at a center of the image panel surface, illustrated in FIG. 13F. This is because a distribution shape of the blurred image of FIG. 13F is a shape obtained by performing convolution on the dot image intensity distribution illustrated in FIG. 13E by a pixel pitch of dimming pixels, but the dot image intensity distribution of FIG. 13E is originally discrete as illustrated. In a distribution of a blurred image of a single pixel at an end of the image panel surface illustrated in FIG. 13G, it can be seen that a distribution shape changes when compared with the illuminance distribution formed by the central pixel, illustrated in FIG. 13F. This is because, when defocusing is performed by deviating a position in the optical axis direction (Z direction), light distributions are different on the central side and the end side of the panel. In contrast, in the present embodiment, each dot image intensity distribution is uniform, and thus a distribution shape does not change regardless of a position on the image panel surface PF. For example, as illustrated in FIG. 13H, in a case where a blurred image is formed by deviating a position in the optical axis direction (Z direction) so as to perform defocusing, if an extent of deviation of an arc position is large, a distribution of a blurred image on the image panel is considerably deviated, and thus a distribution shape changes. This is because the above-described biasing occurs in a light distribution on the light source side due to the deviation of the arc position. In addition, in a case where an extent of the deviation of the arc position is large as in FIG. 13H, a phenomenon occurs in which a boundary line which is not present in the input image appears as illustrated in FIG. 2F. In the present embodiment, as described above, there is a configuration in which formation of a blurred image on the image panel is not influenced even if a light distribution on the light source side is biased, and thus a distribution shape does not change even in a case where an arc position is deviated as illustrated in FIG. 13D.

Figure 14A:
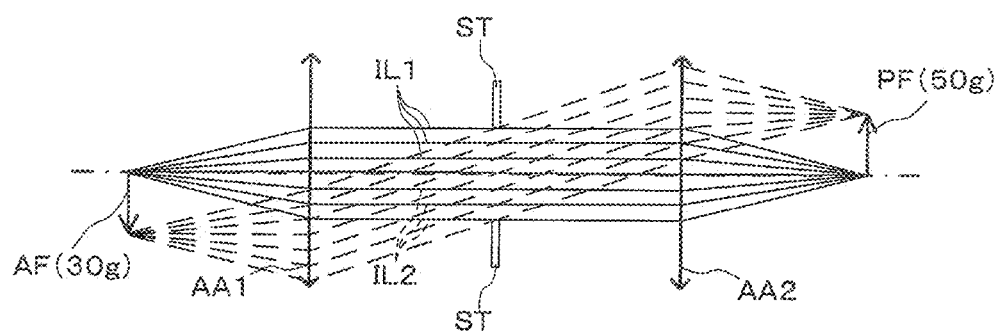
FIGS. 14A and 14B are diagrams illustrating a principle related to a distribution shape.
Figure 14B:
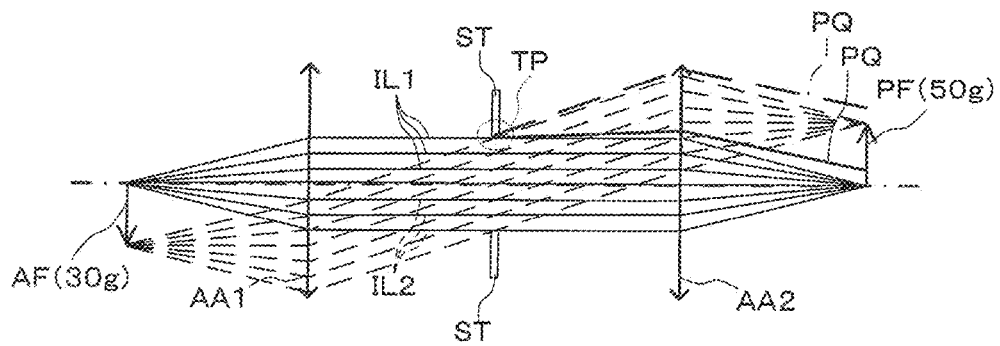

Hereinafter, with reference to FIGS. 14A and 14B, a description will be made of a configuration in which there is no difference in a distribution shape in the case of FIG. 13B and the case of FIG. 13C, that is, the distribution shape does not depend on a position by describing the occurrence of aberration. First, FIG. 14A conceptually illustrates a model in which aberration is favorably corrected. Components IL1 in FIG. 14A indicate components of luminous flux emitted from a center of the dimming panel surface AF, and components IL2 indicate components emitted from a peripheral side. In other words, the components IL1 correspond to components at a position where an image height is zero, and the components IL2 correspond to components at a position where an image height is large. FIG. 14B exemplifies a case where there is a factor generating aberration at the position (pupil position) of the diaphragm ST under the condition of FIG. 14A. Herein, for better understanding of description, a case is assumed in which a component PQ of light is bent at an end part TP of the diaphragm ST in FIG. 14B. In this case, at the position (pupil position) of the diaphragm ST, marginal light beams of all light beams including the components IL1 and the components IL2 pass through the position so as to intersect each other, and thus both the components IL1 and the components IL2 are subjected to an action of bending light so that the same aberration occurs. In other words, aberration has an influence on all image heights to the same extent. For this reason, there is no difference between distribution shapes at all positions on the image panel without being limited to the condition where the case of FIG. 13B is compared with the case of FIG. 13C.

As described above, in the projector 100 according to the present embodiment, the relay optical system 40 (the optical systems 40g, 40r and 40b) includes the light diffusion elements 144g, 144r and 144b as light deflection members OC exhibiting a diffusion action, and thus a cross-section of luminous flux at image formation positions of the color modulation light valves 50g, 50r and 50b can be adjusted to a state of having an appropriate size (enlarged size), that is, a state in which an image is not completely formed but is blurred. Therefore, it is possible to form a favorable image by minimizing moire.

Hereinafter, with reference to FIGS. 15A to 15D, a modification example of the present embodiment will be described. In the present modification example, as illustrated in FIGS. 15A and 15B, a light diffusion element having a multi-lens array structure in which a plurality of lenses are arranged in the same manner as in a case of FIG. 10A is constituted by different kinds of first base material PA1 and second base material PA2 as the light diffusion element 144g or the like, but has a hexagonal arrangement unlike in the case of FIGS. 10A to 10C. In addition, it is assumed that distances dd1 between lens centers CL of respective small lenses SS or a curvature radius of each small lens SS is the same as in the case of FIGS. 10A to 10C. In this case, as illustrated in FIG. 15C, a shape of a dot image intensity distribution is a regular hexagonal shape. As illustrated in FIG. 15D, a distribution shape of a blurred image is a shape obtained by superimposing FIG. 15C, and is approximately a circular shape. Therefore, it is possible to reduce the influence of a rotational error of the light diffusion element 144g in the optical axis direction.

Hereinafter, with reference to FIGS. 16A to 16E, another modification example of the present embodiment will be described. In the present modification example, as illustrated in FIG. 16A, a light diffusion element having a multi-lens array structure in which a plurality of lenses are arranged in the same manner as in a case of FIG. 10A is constituted by different kinds of first base material PA1 and second base material PA2 as the light diffusion element 144g or the like, but has a random arrangement as illustrated in FIGS. 16B and 16C unlike in FIGS. 10A to 10C. In other words, a multi-lens array structure is formed on the basis of a random state as illustrated in FIG. 16C from a hexagonal arrangement state shown with respect to the lens center CL in FIG. 16B. In this case, as illustrated in FIG. 16D, a shape of a dot image intensity distribution is a shape obtained by modifying a regular hexagon. In addition, as illustrated in FIG. 16E, a distribution shape of a blurred image is a shape obtained by superimposing FIG. 16D, and is approximately a circular shape. Therefore, it is possible to reduce the influence of a rotational error of the light diffusion element 144g in the optical axis direction.

Hereinafter, with reference to FIGS. 17A to 17D, still another modification example of the present embodiment will be described. In the present modification example, as the light diffusion element 144g or the like, as illustrated in FIGS. 17A and 17B, the light diffusion element 144g is a diffusion plate which causes Gauss scattering. In other words, as illustrated in FIG. 17A, the light diffusion element 144g emits illumination luminous flux IL which is incident, as diffused light DL which scatters in accordance with an intensity distribution of a Gaussian curve illustrated in FIG. 17B, that is, which is Gauss-diffused. Herein, as an example, a full width at half maximum HH is 0.3. In this case, as illustrated in FIG. 17C, a shape of a dot image intensity distribution is approximately a circular shape, and thus a distribution shape of a blurred image is also approximately a circular shape as illustrated in FIG. 17D.

Others

The invention is not limited to the embodiments, and may be implemented in various aspects within the scope without departing from the spirit thereof.

Each of the dimming light valves 30g, 30r and 30b or each of the color modulation light valves 50g, 50r and 50b is transmissive, but may employ liquid crystal panels of various types such as a TN type, a VA type, and an IPS type. In addition, a reflective type as well as the transmissive type may be used. Here, the term "transmissive type" indicates a type of liquid crystal panel through which modulated light is transmitted, and the term "reflective type" indicates a type of liquid crystal panel which reflects modulated light.

In addition, in the above description, a total of six light valves including the three dimming light valves 30g, 30r and 30b constituting the dimming system 30 and the three color modulation light valves 50g, 50r and 50b constituting the image display system 50 are used, but other configurations may be employed. For example, there may be a configuration in which a single dimming light valve is disposed on a front stage of the color splitting/light guide optical system 20 as the dimming system 30. Further, there may be a configuration in which a single dimming light valve is disposed on a rear stage of the combination optical system 60 as the dimming system 30.

In the above description, the relay optical system includes the double Gauss lenses and the pair of meniscus lenses having a positive power, but these are not essential constituent elements, and, for example, there may be a configuration in which the meniscus lenses are omitted, or a configuration in which the double Gauss lenses and the meniscus lenses are omitted.

In addition, in the above description, images of respective colors formed by the plurality of color modulation light valves 50g, 50r and 50b are combined, but an image may be formed by a color or monochrome color modulation light valve which is a single light modulation element (color modulation element) instead of the plurality of color modulation light valves, that is, color modulation elements, and the image may be enlarged and projected by the projection optical system 70. In this case, a dimming light valve may also be constituted by a single light modulation element (luminance modulation element), and may be on a front stage or a rear stage of the color modulation light valve.

Further, in the above-described embodiments, the optical paths of respective split color light beams have an equal optical path length, but may not have an equal optical path length.

In the above description, the diaphragm is disposed at the pupil position along with the phase plate, but there may be a configuration in which the diaphragm is omitted. In addition, for example, there may be a configuration in which the phase plate and the diaphragm are integrally formed, or the like.

Instead of the color modulation light valves 50g, 50r and 50b, a digital micromirror device or the like which has a micromirror as a pixel may be used as a light modulation element.

The entire disclosure of Japanese Patent Application No. 2013-234712 filed Nov. 13, 2013 and Japanese Patent Application No. 2014-158447 filed Aug. 4, 2014 are expressly incorporated by reference herein.

What is claimed is:

1. A projector comprising:
    an illumination optical system that emits light;
    a light modulation device that modulates light emitted from the illumination optical system; and
    a projection optical system that projects light modulated by the light modulation device, wherein
    the light modulation device includes:
        a first pixel matrix and a second pixel matrix that are disposed in series on an optical path of the light emitted from the illumination optical system, and
        a relay optical system that is disposed on the optical path between the first pixel matrix and the second pixel matrix,
    the relay optical system includes a light deflection member that is a phase plate that is disposed at a pupil position and that changes a direction of light so as to cause blurring, and
    when a pixel pitch of the first pixel matrix is set to L, magnification of the relay optical system is set to M, and a difference between blurred amounts at an image formation position of the second pixel matrix depending on the presence or the absence of the light deflection member is set to b, $ML/2 \leq b \leq 3\,ML$ is satisfied.

2. The projector according to claim 1, wherein the light deflection member is a light diffusion element.

3. The projector according to claim 2, wherein the light diffusion element is obtained by joining two or more materials having different light transmittances to each other.

4. The projector according to claim 3, wherein, in the light diffusion element, an inner surface which is a joint surface of the two or more materials having different light transmittances has a curved shape, and outer surfaces which are a front surface and a rear surface have a planar shape.

5. The projector according to claim 2, wherein the light diffusion element is a lens array in which a plurality of lenses are arranged in a two-dimensional form.

6. The projector according to claim 5, wherein, in the light diffusion element, an arrangement of the plurality of lenses is a simple tetragonal arrangement.

7. The projector according to claim 5, wherein, in the light diffusion element, an arrangement of the plurality of lenses is a hexagonal arrangement.

8. The projector according to claim 5, wherein, in the light diffusion element, an arrangement of the plurality of lenses is a random arrangement.

9. The projector according to claim 2, wherein the light diffusion element is a diffusion plate which causes Gauss scattering.

10. The projector according to claim 1, wherein a surface of the phase plate has a cubic function shape in an arbitrary direction perpendicular to an optical axis and another direction intersecting the arbitrary direction.

11. The projector according to claim 1, wherein a surface of the phase plate has a quartic function shape in an arbitrary direction perpendicular to an optical axis and another direction intersecting the arbitrary direction.

12. The projector according to claim 1, wherein the relay optical system is an optical system of equal magnification which is symmetric with respect to a position of the phase plate along an optical axis.

13. The projector according to claim 1, wherein a surface of the phase plate has the same shape in an arbitrary direction perpendicular to an optical axis and another direction intersecting the arbitrary direction.

14. The projector according to claim 1, wherein the relay optical system further includes double Gauss lenses that are disposed with the light deflection member interposed therebetween along the optical path.

15. The projector according to claim 14, wherein the relay optical system further includes a pair of meniscus lenses that are disposed with the double Gauss lenses interposed therebetween along the optical path and each of which has a positive power.

16. The projector according to claim 1, further comprising:
    a color splitting/light guide optical system that splits the light emitted by the illumination optical system into a plurality of color light beams of different wavelength bands and guides the color light beams;
    a modulation optical system that is provided with a plurality of light modulation devices each of which includes the first pixel matrix, the second pixel matrix, and the relay optical system so as to correspond to the plurality of color light beams, and that modulates the plurality of color light beams split by the color splitting/light guide optical system; and a combination optical system that combines modulated light beams of respective colors which have been modulated by the modulation optical system with each other, and emits combined light toward the projection optical system.

17. The projector according to claim 16, wherein the modulation optical system includes a plurality of light deflection members that show different conversion characteristics so as to correspond to optical paths of the plurality of color light beams.

18. The projector according to claim 1, wherein, in the light modulation device, of the first pixel matrix and the second pixel matrix, a single pixel of the first pixel matrix disposed on an optical path upstream side corresponds to a plurality of pixels of the second pixel matrix disposed on an optical path downstream side.

* * * * *